(12) United States Patent
Nakai et al.

(10) Patent No.: US 11,573,020 B2
(45) Date of Patent: Feb. 7, 2023

(54) AIR-CONDITIONING APPARATUS INCLUDING DETECTOR TO DETECT CONTAMINANT ADHERED TO DRAIN PAN

(71) Applicant: Mitsubishi Electric Corporation, Tokyo (JP)

(72) Inventors: Takafumi Nakai, Tokyo (JP); Akira Morikawa, Tokyo (JP); Isamu Hirashiki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 44 days.

(21) Appl. No.: 16/973,038

(22) PCT Filed: Jun. 29, 2018

(86) PCT No.: PCT/JP2018/024780
§ 371 (c)(1),
(2) Date: Dec. 8, 2020

(87) PCT Pub. No.: WO2020/003489
PCT Pub. Date: Jan. 2, 2020

(65) Prior Publication Data
US 2021/0270479 A1 Sep. 2, 2021

(51) Int. Cl.
*F24F 13/22* (2006.01)
*F24F 11/30* (2018.01)
(Continued)

(52) U.S. Cl.
CPC .............. *F24F 11/30* (2018.01); *F24F 11/89* (2018.01); *F24F 13/222* (2013.01); *G01N 17/008* (2013.01); *G01S 15/04* (2013.01)

(58) Field of Classification Search
CPC . F24F 2013/227; F24F 2221/22; G01S 15/04; G01N 17/008
See application file for complete search history.

(56) References Cited

U.S. PATENT DOCUMENTS 3,813,532 A * 5/1974 Sato ................... G06G 7/75
327/341
5,389,848 A * 2/1995 Trzaskos ............... B06B 1/0611
310/322

(Continued)

FOREIGN PATENT DOCUMENTS

JP 59-91364 A 5/1984
JP 3-188390 A 8/1991
(Continued)

OTHER PUBLICATIONS

International Search Report and Written Opinion dated Jul. 24, 2018, received for PCT Application No. PCT/JP2018/024780, filed on Jun. 29, 2018, 12 pages including English Translation.
(Continued)

*Primary Examiner* — Jerry-Daryl Fletcher
*Assistant Examiner* — Daniel C Comings
(74) *Attorney, Agent, or Firm* — Xsensus LLP

(57) ABSTRACT

An air-conditioning apparatus includes a drain pan that receives water, and a detector including an ultrasonic sensor that emits and receives ultrasonic waves. The detector analyzes a response signal from the ultrasonic sensor to detect a contaminant generated in the drain pan. A bottom flat surface portion that forms a bottom of the drain pan is located parallel to a flat surface portion that forms a receiving surface of the ultrasonic sensor.

18 Claims, 8 Drawing Sheets

(51) Int. Cl.
*F24F 11/89* (2018.01)
*G01N 17/00* (2006.01)
*G01S 15/04* (2006.01)

(56) References Cited

U.S. PATENT DOCUMENTS

| 2013/0182811 | A1* | 7/2013 | Baba | G21C 17/035 |
| | | | | 376/259 |
| 2018/0074021 | A1* | 3/2018 | Bliss | G01N 29/07 |
| 2020/0003449 | A1 | 1/2020 | Morikawa et al. | |

FOREIGN PATENT DOCUMENTS

| JP | 2002-195989 A | 7/2002 | | |
| JP | 2007-333533 A | 12/2007 | | |
| JP | 2017-72412 A | 4/2017 | | |
| WO | WO-2013092820 A1 * | 6/2013 | | G01B 17/02 |
| WO | WO-2014170395 A1 * | 10/2014 | | G01N 17/008 |
| WO | 2017/149883 A1 | 9/2017 | | |
| WO | WO-2017149883 A1 * | 9/2017 | | F24F 11/89 |

OTHER PUBLICATIONS

Office Action dated Sep. 2, 2021, in corresponding Chinese patent Application No. 201880094540.7, 12 pages.
Office Action dated Mar. 17, 2022, in corresponding Chinese patent Application No. 201880094540.7, 10 pages.

* cited by examiner

AIR-CONDITIONING APPARATUS INCLUDING DETECTOR TO DETECT CONTAMINANT ADHERED TO DRAIN PAN

CROSS-REFERENCE TO RELATED APPLICATION

The present application is based on PCT filing PCT/JP2018/024780, filed Jun. 29, 2018, the entire contents of which are incorporated herein by reference.

TECHNICAL FIELD

The present disclosure relates to air-conditioning apparatuses, and in particular, to an air-conditioning apparatus that detects a contaminant or contaminants generated in a drain pan.

BACKGROUND ART

In general, as a method for measuring an adhered state of a marine organism to the inside of a pipe, it is known that the thickness of adhered part of the marine organism is measured by bringing a probe of an ultrasonic flaw detector into contact with one point of an outer periphery of an inspecting pipe, measuring echoes from the body of the pipe and echoes from a surface of the marine organism, and reading a propagation distance of the echoes from the surface of the marine organism (see, for example, Patent Literature 1). Furthermore, it is known as an inspection method that ultrasonic waves are emitted to a contact surface with a lining portion in a vertical direction, and waves reflected from the contact surface are received, to thereby measure the thickness of the lining portion along with the degree of adhesion, as in a nondestructive inspection method for a lining portion (see, for example, Patent Literature 2).

However, the methods of Patent Literatures 1 and 2 are both intended to measure the thickness of a deposit and the degree of adhesion, and these documents neither disclose nor suggest a motive to applying these methods to detection of a contaminant or contaminants, such as a biofilm, generated on a drain pan of an air-conditioning apparatus. The biofilm is a semisolid slimy substance generated by multiplication of microorganisms in water collected in a drain pan or other locations. The properties of contaminants such as biofilms, for example, the thickness and size, vary from one contaminant to another. Contaminants such as biofilms may clog a drain pump or a drain hose, and from a hygiene standpoint also, the presence of contaminants such as biofilms is undesirable. Furthermore, the drain pan, which is also referred to as waste pan, is a target of a legal inspection under the Act on Maintenance of Sanitation in Buildings, and therefore needs to be regularly cleaned and maintained. Furthermore, since the drain pan is formed integral with a drain pump, etc., in the air-conditioning apparatus, the air-conditioning apparatus thus to be disassembled in order that the drain pan be cleaned and maintained. Therefore, for example, in the case where the air-conditioning apparatus is installed above a ceiling or in similar places, it requires a lot of time and involves a high cost, for example, to clean and maintain the drain pan.

CITATION LIST

Patent Literature

Patent Literature 1: Japanese Unexamined Patent Application Publication No. 3-188390

Patent Literature 2: Japanese Unexamined Patent Application Publication No. 59-091364

SUMMARY OF INVENTION

Technical Problem

However, when the methods of Patent Literatures 1 and 2 are used to detect a contaminant or contaminants generated on the drain pan of the air-conditioning apparatus, if the contaminant is thin or small, sound reflected from the contaminant is not greatly different from that reflected from a clean drain pan (in which no contaminant is present), it may be hard to detect the contaminant.

The present disclosure is applied to solve such a problem as described above, and relates to an air-conditioning apparatus that can improve the accuracy of detection of whether a contaminant or contaminants are present or absent on a drain pan, even under the influence of the properties of contaminants on the drain pan.

Solution to Problem

An air-conditioning apparatus according to an embodiment of the present disclosure includes a drain pan that receives water, and a detector including an ultrasonic sensor that emits and receives ultrasonic waves. The detector analyzes a response signal from the ultrasonic sensor to detect a contaminant generated in the drain pan. A bottom flat surface portion that forms a bottom of the drain pan is located parallel to a flat surface portion that forms a receiving surface of the ultrasonic sensor.

Advantageous Effects of Invention

In the air-conditioning apparatus according to the embodiment of the present disclosure, the bottom flat surface portion that forms the bottom of the drain pan is located parallel to the flat surface portion that forms the receiving surface of the ultrasonic sensor. Therefore, the detector determines whether a contaminant or contaminants are present or absent based on reflected sounds of ultrasonic waves that are reflected respective times from the contaminants. As a result, the accuracy of the above determination is higher than in the case where it is determined whether a contaminant or contaminants are present or absent based on a single reflected sound of the ultrasonic waves.

DESCRIPTION OF EMBODIMENTS

In the following, an air-conditioning apparatus 100, an air-conditioning apparatus 102, an air-conditioning apparatus 104, an air-conditioning apparatus 106, or other air-conditioning apparatuses according to embodiments of the present disclosure are described with reference to the drawings, etc. It should be noted that in the following refigures including FIG. 1, components are illustrated such that the sizes and shapes of the components could be easily understood for explanations thereof. Thus, relationships in relative dimension between the components, the shapes of the components, etc., may be different from actual ones. Also, in each of the following figures, components which are the same as or equivalent to those in a previous one of the figures are denoted by the same reference signs. The same is true of the entire text of the specification. Furthermore, the configurations of components described in the specification are merely examples; that is, the configurations of the components are not limited to the configurations described in the specification. Furthermore, the relationship between sizes of components as illustrated in the figures may be different from that between actual sizes of the components. With respect to the embodiments, in order that they be easily understood, terms related to directions (such as "upper", "lower", "right", "left", front", and "rear") are used as appropriate. However, these terms are used only for explanation, that is, they do not limit the embodiments (the locations or orientations of devices or components).

Embodiment 1

Figure 1:
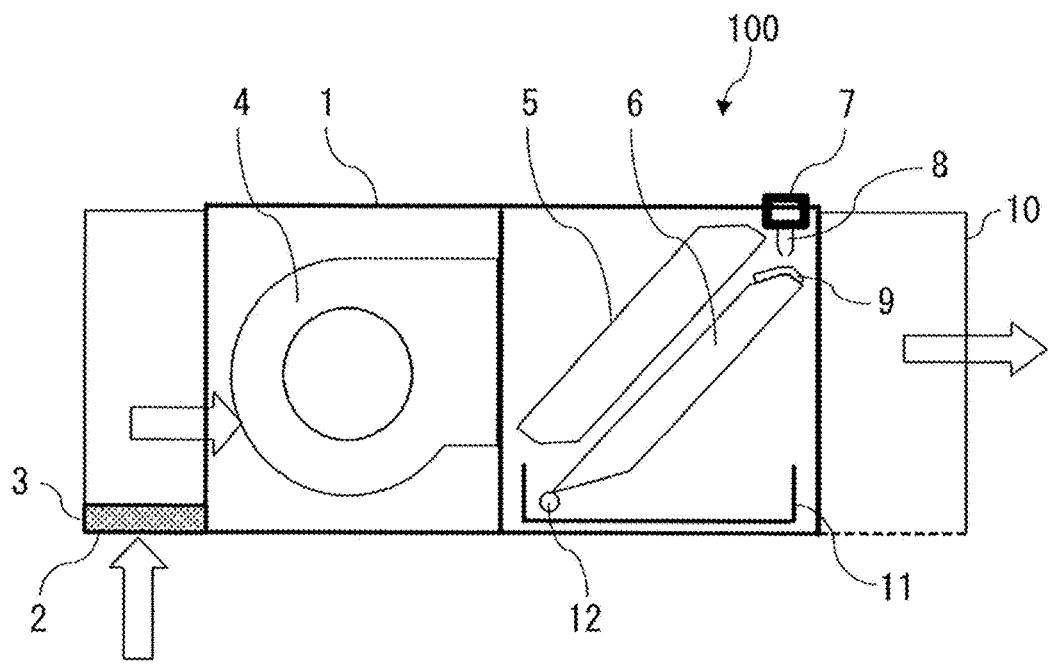
FIG. 1 is a schematic view illustrating a section of an air-conditioning apparatus according to Embodiment 1 of the present disclosure.

<Configuration of Air-Conditioning Apparatus 100>
FIG. 1 is a schematic view illustrating a section of an air-conditioning apparatus 100 according to Embodiment 1 of the present disclosure. In FIG. 1, outlined arrows indicate flow directions of air. As illustrated in FIG. 1, the air-conditioning apparatus 1 includes a fan 4, a heat exchanger 5, a humidifying material 6, a drain pan 11, and a supply unit 7 that are all provided in a housing 1, the supply unit 7 being provided to supply water for use in humidification. The air-conditioning apparatus has a cooling function, a heating function, and a humidifying function. In a side surface of the housing 1, an air inlet 2 is provided to face downwards, and in another side surface of the housing 1, an air outlet 10 is provided. In the air-conditioning apparatus 100, when the fan 4 is driven, air is sucked into the air-conditioning apparatus 100 through the air inlet 2, and conditioned air that has passed through the heat exchanger 5 is blown out of the air-conditioning apparatus 100 through the air outlet 10.

Above the air inlet 2, a filter 3 is provided as a filter that remove dust from air sucked into the housing 1. The fan 4 is provided downstream of the filter 3, and air that is sucked upwards from the air inlet 2 by the fan 4 passes through the filter 3, and is sent into the housing 1.

The heat exchanger 5 is provided downstream of the fan 4, and is inclined such that an upstream side of the heat exchanger 5 is a lower end of the heat exchanger 5 and a downstream side of the heat exchanger 5 is an upper end of the heat exchanger 5. The heat exchanger 5 has a fin-and-tube structure made of aluminum, and causes heat exchanger to be performed between air that passes through a region located around the heat exchanger 5 and refrigerant that circulates in the heat exchanger 5, to thereby heat or cool air.

The humidifying material 6 is, for example, formed by providing a plurality of plate-like members parallel to each other, located below the heat exchanger 5 such that the humidifying material 6 is inclined along the inclination of the heat exchanger 5, and is deformed by shear. The humidifying material 6 has long sides that have substantially the same length as those of the heat exchanger 5. The humidifying material 6 has an upper end whose upper surface is angular, and a diffusing material 9 is mounted on the angular upper surface. Above the upper end of the humidifying material 6, the supply unit 7 and a nozzle 8 are provided to supply water to the humidifying material 6. From the supply unit 7 and the nozzle 8, water is supplied to the humidifying material 6 via the diffusing material 9 located on the upper surface of the humidifying material 6. Although either tap water or industrial water can be used as the above water, it is preferable that the number of scale components such as calcium, magnesium, and silica, which are contained in the water, be small, since the scale components may form a deposit.

The drain pan 11 receives water droplets 12 that are drained from the heat exchanger 5 or the humidifying material 6. The drain pan 11 is provided below the heat exchanger 5 and the humidifying material 6 to receive water droplets 12 drained from the heat exchanger 5 or the humidifying material 6. The drain pan 11 collects, as drainage water, water droplets 12 that drip, because of the force of gravity, from the heat exchanger 5 and the humidifying material 6.

<Configuration of Drain Pan 11 and Components in the Vicinity of Drain Pan 11>

Figure 2:
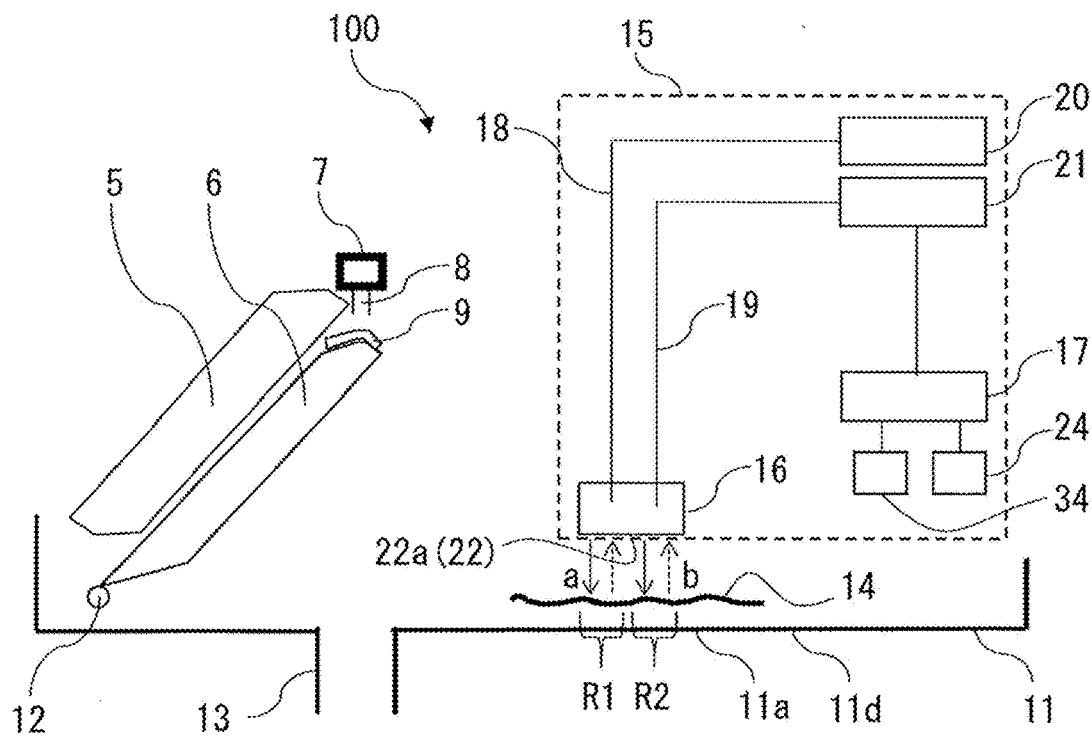
FIG. 2 is a schematic view illustrating a section of a drain pan and components located in the vicinity of the drain pan in the air-conditioning apparatus according to Embodiment 1 of the present disclosure.

FIG. 2 is a schematic view illustrating a section of the drain pan 11 and components located in the vicinity of the drain pan 11 of the air-conditioning apparatus 100 according to Embodiment 1 of the present disclosure. As illustrated in FIG. 2, a drainpipe 13 is connected to a lower surface of the drain pan 11, and a detector 15 is provided above the drain pan 11.

The drainpipe 13 is used to cause drainage water collected in the drain pan 11 to flow out of the drain pan 11 to the outside. When the amount of water corresponding to water droplets 12 that is supplied from the heat exchanger 5 or the humidifying material 6 to the drain pan 11 is smaller than the amount of drainage water that is caused to flow from the drainpipe 13 to the outside, drainage water does not collect in the drain pan 11. When the amount of water corresponding to water droplets 12 that is supplied from the heat exchanger 5 or the humidifying material 6 to the drain pan 11 is larger than the amount of drainage water that is made to flow from the drainpipe 13 to the outside, the water level of drainage water collected in the drain pan 11 rises. The drainpipe 13 is an example of the drainage unit.

The detector 15 includes an ultrasonic sensor 16 that emits and receives ultrasonic waves, and analyzes a response signal from the ultrasonic sensor 16 to detect a contaminant or contaminants 14 generated in the drain pan 11. It should be noted that an example of the contaminant 14 is a biofilm. To be more specific, the detector 15 detect a contaminant or contaminants 14 that are generated on an upper surface of the drain pan 11. The detector 15 includes an electric wire 18, an electric wire 19, a power supply 20, an amplifier detection circuit 21, the ultrasonic sensor 16, an arithmetic device 17, a storage unit 24, and a timing unit 34.

Preferably, the ultrasonic sensor 16 of the detector 15 should be provided above an area of the drain pan 11 where water easily collects. Areas of the drain pan 11 where water easily collect are, for example, an area close to a drain hole connecting with the drainpipe 13, an area close to a suction portion 30a of a drain pump 30 (see FIG. 11), and an area close to the humidifying material 6. The ultrasonic sensor 16 has a flat transmission and reception surface portion 22 that forms a transmission surface for ultrasonic waves and a reception surface for ultrasonic waves. The detector 15 is characterized in that a flat surface portion 22a of the transmission and reception surface portion 22 is located parallel to a bottom flat surface portion 11a that forms a bottom 11d of the drain pan 11. Therefore, the detector 15 can cause ultrasonic waves emitted as a single output from the ultrasonic sensor 16 to be reflected a lot of times between a contaminant or contaminants adhered to the drain pan 11 and the flat surface portion 22a of the ultrasonic sensor 16. In the air-conditioning apparatus 100, the bottom flat surface portion 11a of the bottom 11d of the drain pan 11 is located parallel to a horizontal plane. Although the distance between the bottom flat surface portion 11a of the drain pan 11 and the flat surface portion 22a of the transmission and reception surface portion 22 depends on the size of the air-conditioning apparatus 100, the drain pan 11 and the ultrasonic sensor 16 are provided apart from each other such that the above distance falls within the range of 10 to 200 mm. In order to obtain a plurality of reflected sounds of the ultrasonic waves, preferably, the distance between the bottom flat surface portion 11a of the drain pan 11 and the flat surface portion 22a of the transmission and reception surface portion 22 should fall within the range of 10 to 150 mm, and more preferably, the range of 10 to 100 mm. The arithmetic device 17 of the detector 15 analyzes a response signal from the ultrasonic sensor 16 to determine whether a contaminant or contaminants generated in the drain pan 11 are present or absent. The arithmetic device 17 of the detector 15 is, for example, dedicated hardware or a central processing unit (CPU) that executes a program stored in the storage unit 24. The arithmetic device 17 determines whether a contaminant or contaminants 14 are present or absent, by performing a computation based on data stored in the storage unit 24 and a voltage detected by the amplifier detection circuit 21. The storage unit 24 is a nonvolatile or volatile storage device such as a RAM, a ROM, a flash memory, an EPROM, or an EEPROM. The storage unit 24 stores various kinds of data that is to be read out by the arithmetic device 17, or stores the result of the computation performed by the arithmetic device 17. The timing unit 34 is, for example, a timer or a real-time clock, and measures, for example, the current time.

The contaminant 14 is a complex of mucilaginous polysaccharide that for example, bacteria or mold metabolizes and a dirty component contained in the air, and is a sticky consortium of contaminants that are also called "slime". To be more specific, water droplets 12 containing floating fungi or mold spores that float in an area around the air-conditioning apparatus 100 drip onto the drain pan 11, as a result of which the contaminant or contaminants 14 are generated on the upper surface of the drain pan 11. If the contaminant 14 is adhered to and deposit on a wall surface or a junction between the drainpipe 13 and the drain pan 11, drainage water cannot be caused to flow out from the drainpipe 13 to the outside. Furthermore, at the contaminant 14, bacteria or mold that is harmful to a human body grows. Examples of bacteria harmful to the human body are aerobic Gram-negative bacteria called "*Legionella* bacteria". For example, it is known that the epidemic outbreak of pneumonia in the state of Pennsylvania in the United States of America in 1976 was triggered by *Legionella* contained in an aerosol scattered from a cooling tower. *Legionella* is a strain of *Legionella* bacteria that is denoted as "*Legionella pneumophila*". *Legionella* bacteria are bacteria that inhabit in soil, etc., and, pose a pathogenic risk when grown in the contaminant 14 and dispersed in air.

From a hygiene standpoint, it is preferable that the growth of the contaminant 14 be prevented as much as possible, and for example, a monthly inspection and cleaning of the drain pan 11 is recommended as a regular inspection. However, in many air-conditioning apparatuses 100, a humidifying unit is provided at a ceiling, and it is hard to disassemble the air-conditioning apparatus 100 in order for the drain pan be cleaned. Furthermore, even if an antibacterial agent is provided in the drain pan 11 to prevent the growth of the contaminant 14, the antibacterial agent disappears with the passage of time, that is, the antibacterial agent has no effect with the passage of time. Furthermore, since the growth rate of the contaminant 14 greatly depends on the environment, for example, the amount of nutrients contained in the air or other conditions, it is impossible to determine whether the contaminant 14 grows or not, based on time for which the air-conditioning apparatus 100 is used. Therefore, it is preferable that the detector 15 determine whether a contaminant or contaminants 14 are generated or not, and if the contaminant 14 is generated, an alarm indicating the need to clean the drain pan 11 be given.

As illustrated in FIG. 2, the detector 15 emits ultrasonic waves in a direction indicated by solid arrows a that is a perpendicular to the drain pan 11, detects the ultrasonic waves that are reflected from a contaminant 14 in a direction indicated by dashed arrows b, and determines whether the contaminant 14 generated on the upper surface of the drain pan 11 is generated or not. It should be noted that in FIG. 2, R1 schematically indicates a first reflection of the ultrasonic waves emitted from the detector 15, and R2 schematically indicates a second reflection of the ultrasonic waves. Since the transmission and reception surface portion 22 of the ultrasonic sensor 16 is located parallel to the drain pan 11, the detector 15 can cause ultrasonic waves to be reflected a plurality of times between the transmission and reception surface portion 22 of the ultrasonic sensor 16 and the contaminant 14. The detector 15 detects a plurality of reflected sounds of the ultrasonic waves, and determines whether the contaminant 14 is present or absent, using the arithmetic device 17, from a first reflected sound, a second reflected sound, . . . and an n-th reflected sound.

<Detailed Configuration of Detector 15>

Figure 3:
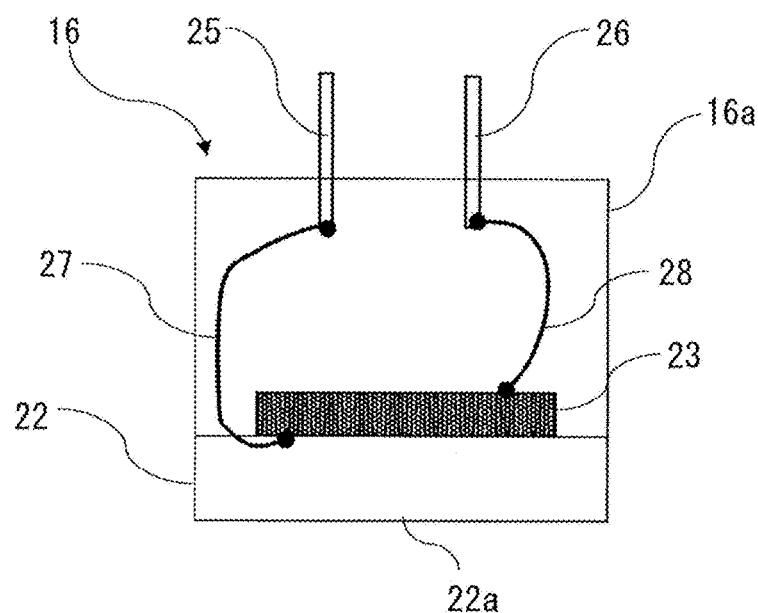
FIG. 3 is a schematic view illustrating an ultrasonic sensor of a detector as illustrated in FIG. 2.

FIG. 3 is a schematic view illustrating the ultrasonic sensor 16 of the detector 15 as illustrated in FIG. 2. As illustrated in FIG. 3, the ultrasonic sensor 16 is configured such that a piezoelectric element 23, an electrode 25, an electrode 26, a lead 27, a lead 28, and the transmission and reception surface portion 22, which is an acoustic matching layer, are housed in a housing 16a. As illustrated in FIG. 3, the ultrasonic sensor 16 is an integrated ultrasonic element that transmits and receives ultrasonic waves with a single piezoelectric element 23. The transmission and reception surface portion 22 has the flat surface portion 22a, which is flat. As illustrated in FIG. 2, the transmission and reception surface portion 22 of the ultrasonic sensor 16 is located such that that the flat surface portion 22a is parallel to the bottom flat surface portion 11a of the bottom 11d of the drain pan 11. It should be noted that the flat surface portion 22a and the bottom flat surface portion 11a are both flat. As illustrated in FIG. 3, the electrode 25 is electrically connected to the piezoelectric element 23 by the lead 27. The electrode 26 is electrically connected to the piezoelectric element 23 by the lead 28. When a high-frequency voltage is applied between the electrode 25 and the electrode 26, the piezoelectric element 23 oscillates to produce ultrasonic waves. Furthermore, when produced ultrasonic waves are reflected from the drain pan 11 or the contaminant 14 on the drain pan 11, and then reach the piezoelectric element 23, the piezoelectric element 23 oscillates because of the ultrasonic waves, and a voltage generated by this oscillation is converted into an electrical signal. Then, this electrical signal is detected from the electrodes 25 and 26. The detector 15 can use the ultrasonic sensor 16 for both transmission and reception, and in such a manner, can emit ultrasonic waves and receive ultrasonic waves reflected from the contaminant 14, using such a single piezoelectric element 23 as described above. At this time, as described above, ultrasonic waves can be reflected a plurality of times between the transmission and reception surface portion 22 of the ultrasonic sensor 16 and the contaminant 14, and the detector 15 can detect these reflected sounds.

Figure 4:
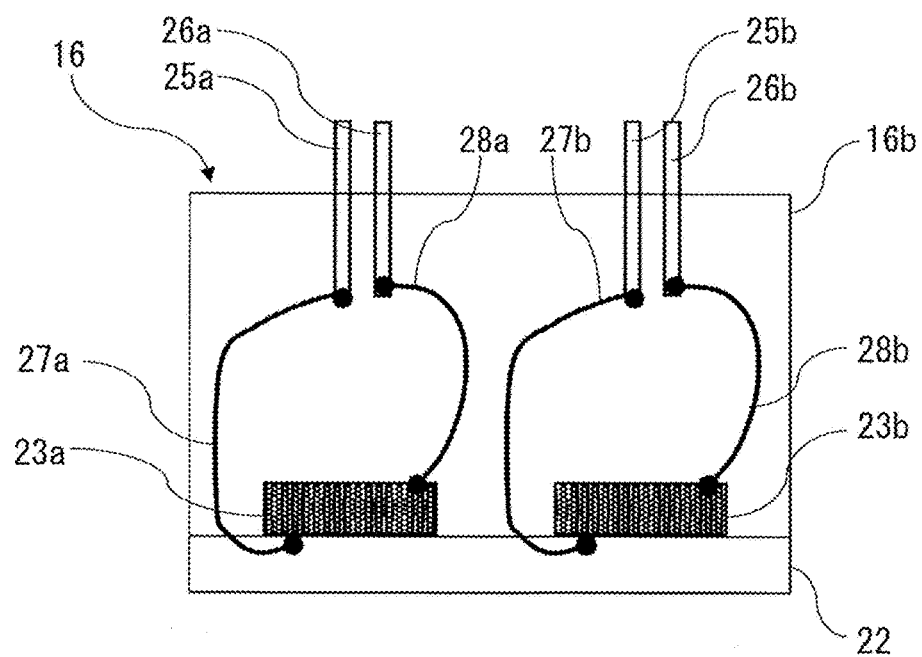
FIG. 4 is a schematic view illustrating another example of the ultrasonic sensor of the detector as illustrated in FIG. 2.

FIG. 4 is a schematic view illustrating another example of the ultrasonic sensor 16 of the detector 15 as illustrated FIG. 2. In the example illustrated in FIG. 4, the ultrasonic sensor 16 is configured such that an ultrasonic wave transmitting piezoelectric element 23a, an electrode 25a, an electrode 26a, a lead 27a, a lead 28a, and a transmission and reception surface portion 22, which is an acoustic matching layer, are housed in a housing 16b. Furthermore, as illustrated in FIG. 4, an ultrasonic wave receiving piezoelectric element 23b connected to the transmission and reception surface portion 22, an electrode 25b, an electrode 26b, a lead 27b, and a lead 28b are housed in the housing 16b. In such a manner, as illustrated in FIG. 4, the ultrasonic sensor 16 may be configured such that the ultrasonic wave transmitting piezoelectric element 23a and the ultrasonic wave receiving piezoelectric element 23b are combined.

The transmission and reception surface portion 22 has the flat surface portion 22a. As illustrated in FIG. 2, the transmission and reception surface portion 22 is located such that the flat surface portion 22a is parallel to the bottom flat surface portion 11a of the bottom 11d of the drain pan 11. It should be noted that the flat surface portion 22a and the bottom flat surface portion 11a are both flat. The electrode 25a is electrically connected to the ultrasonic wave transmitting piezoelectric element 23a by the lead 27a. The electrode 26a is electrically connected to the ultrasonic wave transmitting piezoelectric element 23a by the lead 28a. The electrode 25b is electrically connected to the ultrasonic wave receiving piezoelectric element 23b by the lead 27b. The electrode 26b is electrically connected to the ultrasonic wave receiving piezoelectric element 23b by the lead 28b.

When a high-frequency voltage is applied between the electrode 25a and the electrode 26a, the ultrasonic wave transmitting piezoelectric element 23a oscillates to produce ultrasonic waves. Furthermore, as described above, when the produced ultrasonic waves are reflected from the drain pan 11 or a contaminant 14, and then reach the ultrasonic wave receiving piezoelectric element 23b. Then, the piezoelectric element 23b oscillates because of the ultrasonic waves, and a voltage generated by this oscillation is converted into an electrical signal. Then, this electrical signal is detected from the electrodes 25b and 26b. In such a manner, the ultrasonic sensor 16 of the detector 15 can use both the ultrasonic wave transmitting piezoelectric elements 23a and 23b that are both jointed to the same transmission and reception surface portion 22, that is, the transmission and reception surface portion 22. At this time, as described above, the ultrasonic waves can be reflected a plurality of times between the transmission and reception surface portion 22 of the ultrasonic sensor and the contaminant 14, and the detector 15 can detect these plural reflected sounds as in the configuration in which a single piezoelectric element 23 is used.

The ultrasonic waves are emitted in the form of pulse waves and have a frequency that falls within the range of 40 kHz to 500 kHz. In general, the ultrasonic waves mean sound waves having a frequency of 20 kHz or higher. The ultrasonic waves have properties such that the higher the frequency of the ultrasonic waves, the higher the resolution; however, the maximum distance by which the ultrasonic wave can be emitted is shortened. That is, a trade-off is established. It is therefore preferable that ultrasonic waves have a frequency of 100 to 400 kHz. It should be noted that it is not indispensable that the ultrasonic waves are emitted in pulses, that is, the ultrasonic waves may be emitted continuously. The wavelength $\lambda$ satisfies the following: (velocity of sound) 343/(frequency) 300=1.1 mm, where the frequency is 300 kHz and the velocity of sound in the air is 343 m/s. Furthermore, the period T is the reciprocal of the frequency and thus satisfies $1/300$ kHz=$3 \times 10^{-6}$ s=3 microseconds. The pulse width may be arbitrary. However, if being too long, the pulse width is hard to detect. Therefore, it is appropriate that the pulse with is five times longer than the wavelength. There is a tendency that the larger the number of pulses, the higher the resolution, but the greater the effect of reverberant sounds. It is therefore appropriate that the number of pulses falls within the range of one to approximately one hundred. For a similar reason, it is appropriate that a time period of ultrasonic oscillation falls within the range of 0.003 to 0.5 milliseconds.

Ultrasonic waves are emitted from the ultrasonic sensor 16 to the contaminant 14. It should be noted as the properties of ultrasonic waves and the contaminant 14 that ultrasonic waves are reflected at an interface of an object, and the contaminant 14 has a porous shape. As illustrated in FIG. 2, the ultrasonic waves emitted by the ultrasonic sensor 16 propagate in the air in the direction indicated by the solid arrows a, which is perpendicular to the bottom flat surface portion 11a of the drain pan 11, and arrive at an interface of the contaminant 14. Then, because of the properties of the ultrasonic waves and the shape of the contaminants 14, some of the ultrasonic waves that have arrived at the interface of the contaminants 14 are reflected and propagate in the direction indicated by the dashed allows b toward the ultrasonic sensor 16. The ultrasonic waves having arrived at the ultrasonic sensor 16 are detected as a first response by the detector 15. Furthermore, some of the ultrasonic waves having arrived at the ultrasonic sensor 16 are reflected at the flat surface portion 22a of the transmission and reception surface portion 22, re-propagate in the air in the direction indicated by the solid arrows a, which is perpendicular to the bottom flat surface portion 11a of the drain pan 11, and arrive at the interface of the contaminant 14. Then, similarly, because of the properties of the ultrasonic waves and the shape of the contaminant 14, some of the ultrasonic waves that have arrived at the interface of the contaminant 14 are reflected and propagate in the direction indicated by the dashed allows b toward the ultrasonic sensor 16. The ultrasonic waves having arrived at the ultrasonic sensor 16 are detected as a second response by the detector 15. It is assumed that the last response of ultrasonic waves having arrived at the ultrasonic sensor 16 is an n-th response. The above phenomenon is repeated until the ultrasonic waves are attenuated and no response is made. The others of the ultrasonic waves having arrived at the interface of the contaminant 14 pass through the interface of the contaminant 14 without being reflected.

<Operations of Air-Conditioning Apparatus 100>

Figure 5:
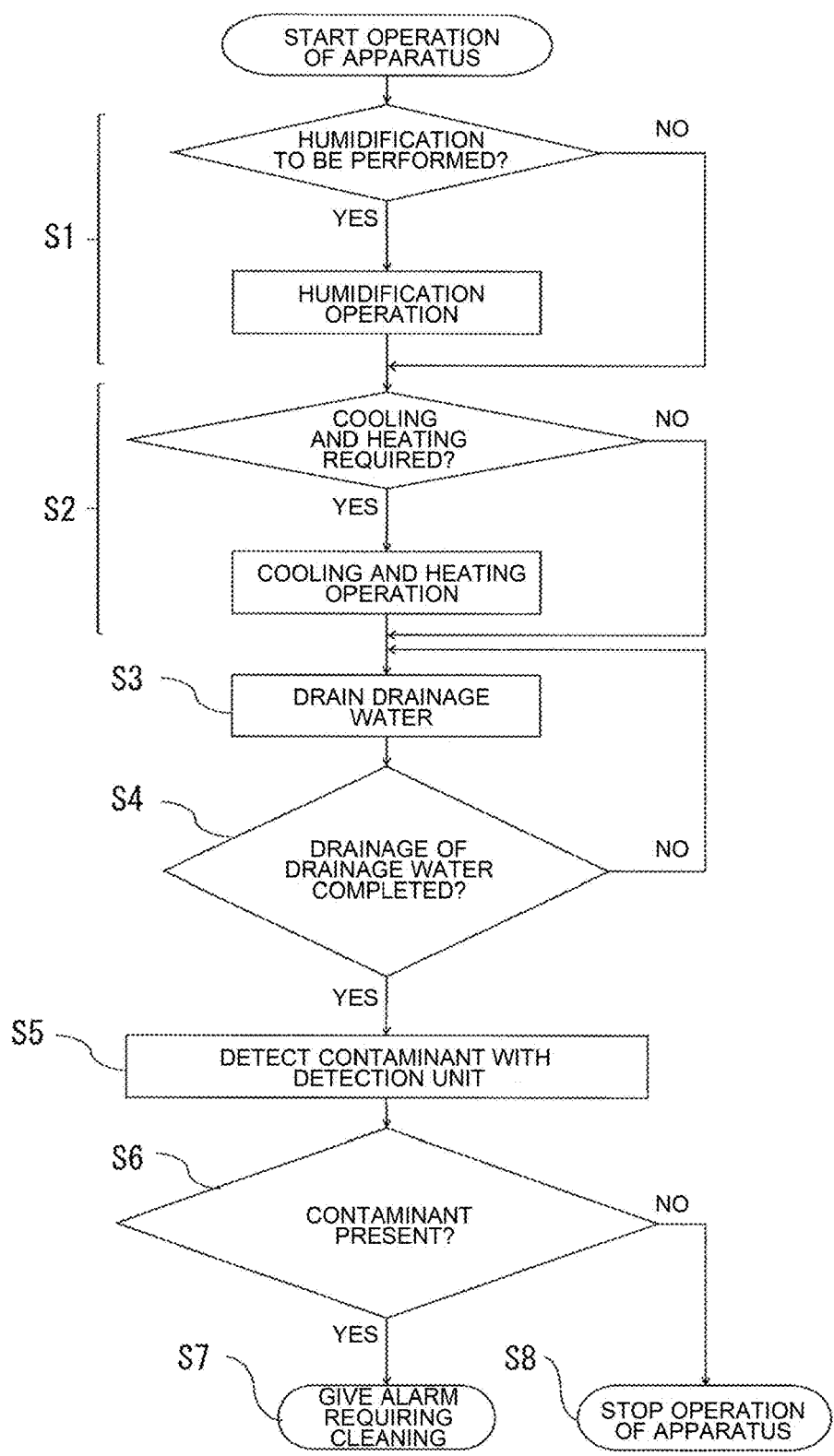
FIG. 5 is a diagram illustrating the entire flow of operations that are carried out by the air-conditioning apparatus 100 according to Embodiment 1 of the present disclosure.

FIG. 5 is a diagram illustrating the entire flow of operations that are performed by the air-conditioning apparatus 100 according to Embodiment 1 of the present disclosure. The air-conditioning apparatus 100 has functions of performing a humidification operation and a cooling/heating operation, and simultaneously or selectively performs the humidification operation and the cooling/heating operation, depending on a required temperature of the air at the outlet and required humidity conditions. When the operation is started, in step S1, the air-conditioning apparatus 100 determines whether to perform humidification, and in step S2, determines whether the cooling/heating operation is required or not. Next, the step to be carried out by the air-conditioning apparatus 100 proceeds to step S3. In step S3, the air-conditioning apparatus 100 starts to drain drainage water 29, and in step S4, determines whether the drainage of the drainage water 29 is completed. In the case where in step S4, the air-conditioning apparatus 100 determines that the drainage is completed, in step S5, the detector 15 detects whether a contaminant 14 is present or absent, and in step S6, the detector 15 starts to determine whether the contaminant 14 is present or absent. Then, in the case where in step S6, the detector 15 determines that the contaminant 14 is present or absent, the step to be carried out by the detector 15 proceeds to step S7, and the detector 15 gives an alarm indicating the need to clean the drain pan 11. On the other hand, in the case where in step S, the detector 15 determines that a contaminant 14 is absent, the step for the detector 15 proceeds to step S8, and the operation of the air-conditioning apparatus 100 is stopped, since it is determined that the operation of the air-conditioning apparatus 100 is completed. The steps will be each described in detail.

<Humidification Operation>

In step 1 as indicated in FIG. 5, when it is determined that humidification is to be performed, and a humidification operation is started, water stored in the supply unit 7 is transferred as humidification water to the nozzle 8 located above the diffusing material 9. The humidification water transferred to the nozzle 8 is dropped from a distal end of the nozzle 8 toward an upper portion of the diffusing material 9, and is supplied to the humidifying material 6. The humidification water evenly diffuses in the entire humidifying material 6 because of the capillary force of the diffusing material 9 and the force of gravity, and a constant amount of humidification water is retained in the humidifying material 6.

Next, the fan 4 starts to operate. Air sucked from the air inlet 2 by the operation of the fan 4 passes through the humidifying material 6 via the filter 3, the fan 4, and the heat exchanger 5, and is transferred to the outside of the air-conditioning apparatus 100 provided with a humidification device, that is, the air is transferred into the indoor space. Humidification water retained in the humidifying material 6 contacts air to evaporate, humidifies the air, and is transferred along with the air into the indoor space. A surplus of the humidification water in the humidifying material 6 that has not evaporated and has not been used in the above humidification is collected in the vicinity of a lower end of the humidifying material 6 because of the force of gravity, leaks from the lower end of the humidifying material 6 through the lower end, and drops downwards. Water droplets 12 that has leaked from the humidifying material 6 and dropped are received as drainage water by the drain pan 11. Then, the drainage water received by the drain pan 11 is drained from the drainpipe 13. In such a manner, by the humidification operation of the air-conditioning apparatus 100, humidified air is supplied to a space to be humidified.

<During Cooling/Heating>

In step S2 as indicted in FIG. 5, when it is determined that the cooling/heating operation is required, and the cooling/heating operation is started, a surface of the heat exchanger 5 is heated or cooled by a heated or cooled refrigerant that flows in the heat exchanger 5. To be more specific, during the heating operation, the heated refrigerant flows into the heat exchanger 5 to heat the surface of the heat exchanger 5, and air that passes over the surface of the heat exchanger 5 is heated. During the cooling operation, the cooled refrigerant flows into the heat exchanger 5 to cool the surface of the heat exchanger 5, and air that passes over the surface of the heat exchanger 5 is cooled. When the temperature of the surface of the heat exchanger 5 drops to a low temperature during the cooling operation, water vapor contained in the air changes into condensation water on the surface of the heat exchanger 5. The condensation water flows downwards from the heat exchanger 5 and changes into water droplets 12, and the water droplets 12 flow to the drain pan 11 and are received as drainage water by the drain pan 11. Then, the drainage water received by the drain pan 11 is drained through the drainpipe 13 as in the humidification operation.

<Step of Draining Drainage Water 29>

Figure 6:
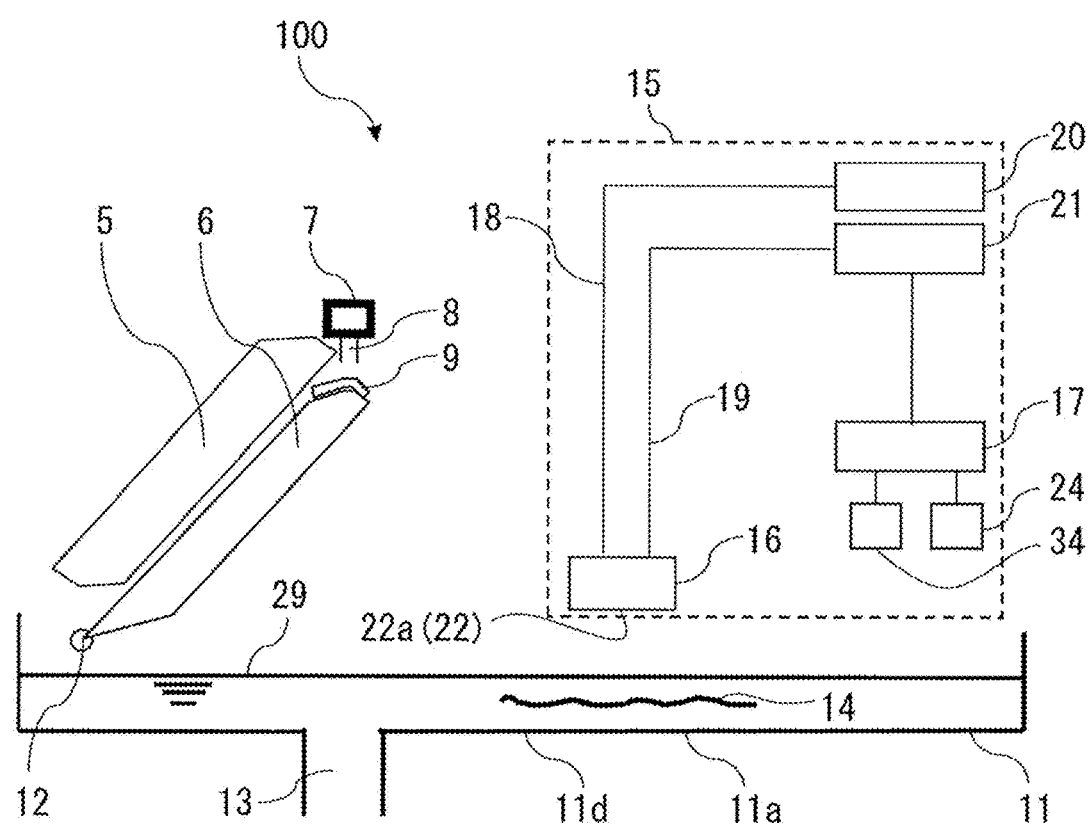
FIG. 6 is a schematic view illustrating a section of the drain pan and components located in the vicinity of the drain pan during a humidification operation or a cooling operation of the air-conditioning apparatus according to Embodiment 1 of the present disclosure.

FIG. 6 is a schematic view illustrating a section of the drain pan 11 and components located in the vicinity of the drain pan 11 during the humidification operation or the cooling operation of the air-conditioning apparatus 100 according to Embodiment 1 of the present disclosure. As illustrated in FIG. 6, during the humidification operation or the cooling operation of the air-conditioning apparatus 100, the water droplets 12 received by the drain pan 11 are collected as drainage water 29 in the drain pan 11. At the same time, this drainage water 29 is drained from the drain pan 11 through the drainpipe 13 provided in the drain pan 11 (step S3). When the humidification operation or the cooling operation of the air-conditioning apparatus 100 is stopped, the supply of the water droplets 12 to the drain pan 11 is stopped, and then when a certain period of time elapses, the drainage of the drainage water 29 through the drainpipe 13 is completed.

As an example of the determination of whether the drainage is completed or not (step S4), when a set time period elapses after the cooling operation or humidification operation of the air-conditioning apparatus 100 is stopped, the detector 15 determines that drainage of water from the drain pan 11 is completed, and starts to detect a contaminant 14. For example, in the case where the set time period is twenty minutes, when twenty minutes elapse after the humidification operation or cooling operation of the air-conditioning apparatus 100 is stopped, the detector 15 determines that such a drainage step as described above is completed, and starts to detect a contaminant 14. However, actually, a drainage rate varies depending on the size of the drainpipe 13 or the inclination angle of the drain pan 11, and time required to complete the drainage of the drainage water 29 thus varies depending on a drainage characteristic. Therefore, a time period that is required until the amount of moisture reaches a sufficient amount that corresponds to a sufficiently steady state after the humidification operation or cooling operation of the air-conditioning apparatus 100 is stopped may be calculated in advance, and the calculated required time may be determined as the set time period (for example, one or two hours). Furthermore, in the case where the drain pan 11 is made of plastic, in general, the drain pan 11 has water repellency. Thus, when the water level of the drainage water 29 drops, the drainage water 29 changes into water droplets on the drain pan. For this reason, in the case where the drainage water 29 is present only at part of the bottom flat surface portion 11a of the bottom 11d of the drain pan 11, and water droplets are discretely present, it may be determined that the drainage of the drainage water 29 is completed. To be more specific, a time period that is required until water droplets having a diameter of 20 mm or less appear at the bottom flat surface portion 11a of the bottom 11d of the drain pan 11 may be calculated in advance, and the calculated required time may be determined as the set time period. In these cases, for example, the set time period is stored as data in the storage unit 24, and the arithmetic device 17 of the detector 15 determines, based on the set time period stored in the storage unit 24 and time acquired from the timing unit 34, whether the set time period elapses or not, after the cooling operation or the humidification operation is stopped.

In another example of the determination of whether the drainage is completed (step S4), in the air-conditioning apparatus 100, a plurality of water detection sensors that are commercially available as water leakage detectors and detect a change in resistance between electrodes are provided on the upper surface of the drain pan 11. Furthermore, at the point of time when the outputs of the water detection sensors decreases or the variation between the outputs of the water detection sensors increases, the detector 15 may determine that the step of draining the drainage water 29 is completed. Alternatively, when the air-conditioning apparatus 100 enters a state in which the air-conditioning apparatus 100 will immediately start the humidification operation or the cooling operation, the detector 15 may determine the above state as a state in which the drain step is completed as the drainage water 29 is drained and does not remain in the drain pan 11.

Actually, since a large number of contaminants 14 containing water are present even after the drainage step, it is hard to completely separate the contaminants 14 and the drainage water 29 from each other. In the case where the detector 15 determines whether a contaminant or contaminants 14 are present or absent, it is important to eliminate the effect of the drainage water 29 on the measurement of ultrasonic waves. However, regarding detection of a contaminant 14 by the detector 15, it is not important to completely get rid of water from the contaminant 14. For example, as illustrated in FIG. 6, in the case where a contaminant 14 is immersed in the drainage water 29, both a solid-liquid interface of the contaminant 14 and a gas-liquid interface of the drainage water 29 are present, and the measurement of ultrasonic waves is affected by the gas-liquid interface of the drainage water 29. On the other hand, as illustrated in FIG. 2, in the case where only a contaminant 14 is present on the drain pan 11, the measurement of ultrasonic waves by the detector 15 is not affected even if water droplets are locally present at the bottom flat surface portion 11a of the bottom 11d of the drain pan 11. To be more specific, if the amount of water per unit area falls within the range of 0 to 50 mg/cm$^2$, no problem arises for the measurement of ultrasonic waves. However, once the amount of water exceeds 50 mg/cm$^2$, the contaminant 14 is immersed in water, and the measurement of ultrasonic waves is affected by the interface of the drainage water 29. From the above reason, it is possible to eliminate the effect of the interface of the drainage water 29 on the measurement of ultrasonic waves, by measuring ultrasonic waves, with the amount of water reduced to 50 mg/cm$^2$ or less. In the air-conditioning apparatus 100 according to Embodiment 1, it is confirmed in advance that by the above drainage step, the amount of water is reduced to 50 mg/cm$^2$ or less.

<Detection of Contaminant 14>

The detection of contaminant 14 by the detector 15 (step S5) is performed in a state where the drainage water 29 is drained from the drain pan 11 after the humidification operation or cooling operation of the air-conditioning apparatus 100 is stopped. The state where the drainage water 29 is drained is a state in which the above drainage step ends or a state in which the air-conditioning apparatus 100 enters the state in which the air-conditioning apparatus 100 will immediately start the humidification operation or the cooling operation. When the set time period (for example, one or two hours) elapses after the stop of the humidification operation or cooling operation the air-conditioning apparatus 100, the detector 15 determines that the drainage step is completed, and starts to detect a contaminant 14 (step S5). In the detector 15, the piezoelectric element 23 in the ultrasonic sensor 16 oscillates, and the ultrasonic sensor 16 emits ultrasonic pulse waves having a wavelength of 300 kHz from the transmission and reception surface portion 22. As illustrated in FIG. 2, the ultrasonic waves propagate in the air in the direction indicated by the solid arrows a that is perpendicular to the bottom flat surface portion 11a of the drain pan 11, and are reflected at an interface between the contaminant 14 and the air. The reflected ultrasonic waves propagate in the air in the direction indicated by the dashed allows b toward the transmission and reception surface portion 22 of the ultrasonic sensor 16. When the reflected ultrasonic waves arrive at the ultrasonic sensor 16, the detector 15 obtains a first oscillation at the piezoelectric element 23 of the ultrasonic sensor 16. Then, some of the ultrasonic waves that have arrived at the ultrasonic sensor 16 are reflected at the transmission and reception surface portion 22, re-propagate in the air in the direction indicated by the solid arrows a that is perpendicular to the bottom flat surface portion 11a of the drain pan 11, and are re-reflected at the interface between the contaminant 14 and the air. The reflected ultrasonic waves propagate in the air in the direction of the dashed allows b toward the transmission and reception surface portion 22 of the ultrasonic sensor 16. When the reflected ultrasonic waves arrive at the ultrasonic sensor 16, the detector 15 obtains a second oscillation at the piezoelectric element 23 of the ultrasonic sensor 16. The detector 15 repeats the above phenomenon and obtains oscillations up to an n-th oscillation at the piezoelectric element 23 until no ultrasonic waves are reflected. When the piezoelectric element 23 obtains the oscillations, voltages are generated between the electrodes 25 and 26, and the amplifier detection circuit 21 detects first to n-th voltages as responses from the contaminant 14. When the arithmetic device 17 performs a computation based on the voltages detected by the amplifier detection circuit 21, the detector 15 determines whether the contaminant 14 is present or absent (step S6). When the detector 15 determines, based on the result of the determination of whether the contaminant 14 is present or absent, that the contaminant 14 is present, the detector 15 gives an alarm indicating the need to clean the drain pan 11 (step S7). Thus, the use can know whether the contaminant 14 is present on the drain pan 11.

In the case where neither a contaminant 14 nor drainage water 29 is present on the drain pan 11, ultrasonic waves are reflected at the flat surface portion 11a of the bottom 11d of the bottom of the drain pan 11 and arrive at the detector 15. The drain pan 11 is made of plastic such as ABS, and has a higher acoustic impedance than air and high smoothness. Thus, the drain pan 11 has a high ultrasonic reflectivity. The contaminant 14 have large asperities, whereby ultrasonic waves arriving at the contaminant 14 easily scatters. Therefore, the presence of the contaminant 14 can be quantified by measuring responses of the ultrasonic waves in the absence of the contaminant 14 or drainage water 29 on the drain pan 11 and measuring the extent of the scatter of the ultrasonic waves based on the ultrasonic responses.

Figure 7:
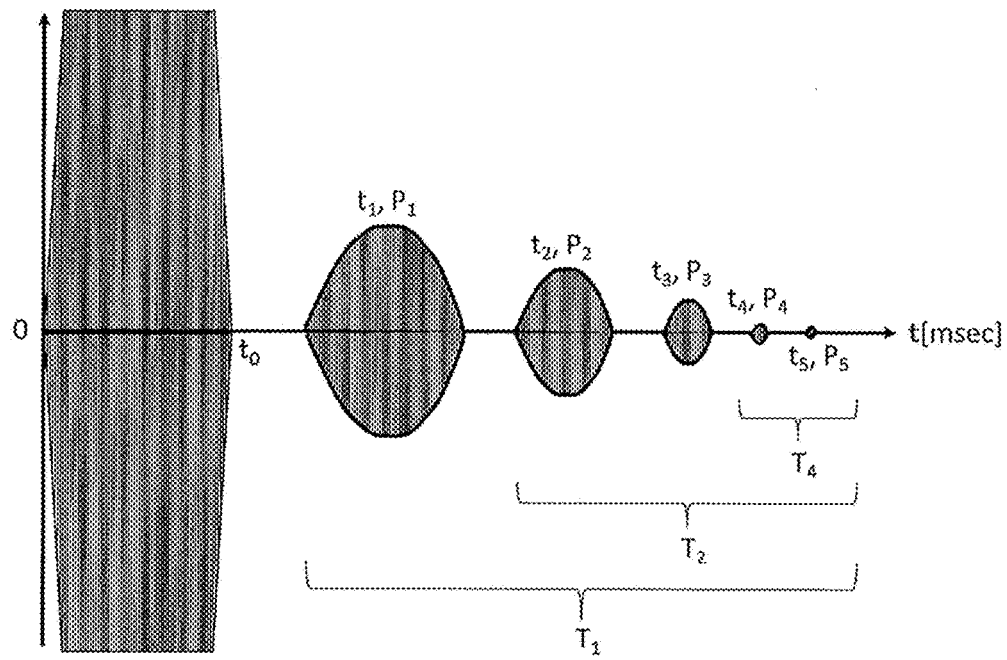
FIG. 7 is a graph illustrating ultrasonic responses in the case where the drain pan as illustrated in FIG. 2 is clean.

FIG. 7 is a graph indicating responses of ultrasonic waves in the case where the drain pan 11 as illustrated in FIG. 2 is clean. FIG. 7 illustrates responses of ultrasonic waves that are detected by the detector 15 in the drain pan 11 in the case where the contaminant 14 is absent on the drain pan 11. In FIG. 7, the vertical axis of the graph represents voltage P [mV] that corresponds to response intensities of the ultrasonic waves, and the horizontal axis of the graph represents time t [msec] that elapses from time at which the ultrasonic waves are emitted. Variations of voltages that are made until the elapsed time reaches elapsed time to are derived from a resonance phenomenon of the detector 15. In FIGS. 7, $t_1$, $t_2$, . . . , and $t_5$ represent times at which the values of voltages reach peak values. Further, in FIG. 7, $P_1$, $P_2$, . . . , and $P_5$ represent peak voltages.

As illustrated in FIG. 7, when ultrasonic waves are emitted from the ultrasonic sensor 16 at a time t=0, the value of an ultrasonic response, that is, a response of the ultrasonic waves, reaches a first peak value after time $t=t_1$. This first peak value is a value for ultrasonic waves that are received as a response by the piezoelectric element 23, and the ultrasonic waves are ultrasonic waves that propagate in the air and are reflected at an interface between the air and the drain pan 11. That is, a peak value for the ultrasonic waves received by the piezoelectric element 23 is a response by the drain pan 11. Furthermore, the value of a response of the ultrasonic waves reaches a second peak value after time $t=t_2$. This second peak value is the value of ultrasonic waves that are received as a response by the piezoelectric element 23, after part of the first reflected sound is reflected at the transmission and reception surface portion 22, re-propagates in the air, and is reflected for a second time at the interface between the air and the drain pan 11. The above phenomenon is repeated, and FIG. 7 indicates responses of ultrasonic waves that are received by the piezoelectric element 23 after being reflected as third, fourth, and fifth reflections after times $t=t_3$, $t_4$, and $t_5$, respectively. As illustrated in FIG. 7, the peak value of the voltage for each of responses of ultrasonic waves is smaller than that for a previous one of the responses; that is, the peak values satisfy $P_1>P_2>P_3>P_4>P_5$. This seems to be because the ultrasonic waves are attenuated when propagating in the air, which is a medium, when being reflected at the interface between the air and the drain pan 11, and when being reflected at an interface between the air and the transmission and reception surface portion 22.

Figure 8:
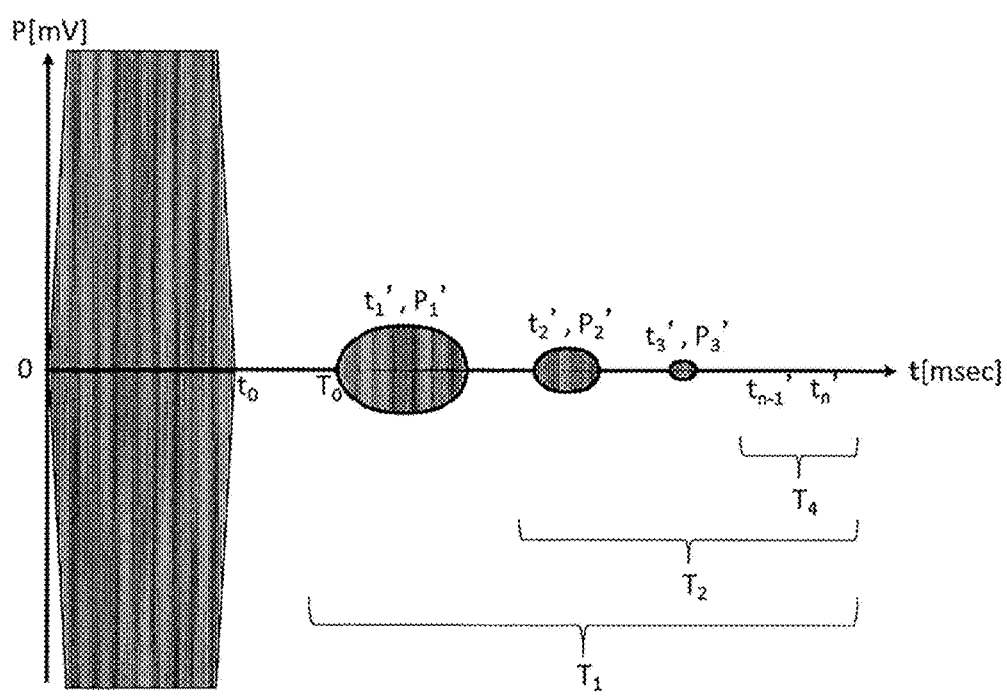
FIG. 8 is a graph illustrating ultrasonic responses in the drain pan as illustrated in FIG. 2 in the case where a contaminant is generated in the drain pan.

FIG. 8 is a graph indicating responses of ultrasonic waves in the drain pan 11 in the case where contaminants 14 are generated in the drain pan 11 as illustrated in FIG. 2. It should be noted that a contaminant 14 for use in an experiment regarding the graph indicated by FIG. 8 was generated through the step of generating the contaminant 14 on the bottom flat surface portion 11a of the drain pan 11, by repeating for sixty days, a cycle in which the air-conditioning apparatus 100 is made to perform the humidification operation for consecutive six hours and is then kept in stopped state for eighteen hours. FIG. 8 indicates responses of ultrasonic waves that are detected by the detector 15 in the drain pan 11 in the state illustrated in FIG. 2 where the drainage water 29 is drained. In FIG. 8, the vertical axis of the graph represents voltage P [mV] that corresponds to response intensities of the ultrasonic waves, and the horizontal axis of the graph represents time t [msec] that elapses from time at which the ultrasonic waves are emitted. Variations of voltages that are made until the elapsed time reaches elapsed time to' are derived from a resonance phenomenon of the detector 15. In FIG. 8, $t_1'$, $t_2'$, and $t_3'$ represent times at which the values of voltages reach peak values. In FIG. 8, $P_1'$, $P_2'$, and $P_3'$ represent peak voltages.

As illustrated in FIG. 8, in the state of FIG. 2 where the contaminant 14 is present and the contaminant 14 is not immersed in drainage water, when ultrasonic waves are emitted from the ultrasonic sensor 16 at the time t=0, the value of a response of the ultrasonic waves reaches a first peak value after time $t=t_1'$. This first peak value is a value for ultrasonic waves that are received as a response by the piezoelectric element 23 after the ultrasonic waves propagate in the air and are reflected at the interface between the air and the contaminant 14. That is, a peak value for the ultrasonic waves received by the piezoelectric element 23 is a response from the contaminant 14. Furthermore, a value for a response of ultrasonic waves reaches a second peak value after a time $t=t_2'$. This second peak value is a value for the ultrasonic waves that are received as a response by the piezoelectric element 23 after part of the first reflected sound is reflected at the transmission and reception surface portion 22, re-propagates in the air, and is reflected for the second time at the interface between the air and the contaminant 14. The above phenomenon is repeated, and FIG. 8 indicates a response of ultrasonic waves that are received by the piezoelectric element 23 after being reflected at third reflection after time $t=t_3'$. As illustrated in FIG. 8, the peak value of the voltage for each of responses of ultrasonic waves is smaller than that for a previous one of the responses; that is, the peak values satisfy $P_1'>P_2'>P_3'$. This seems to be because the ultrasonic waves are attenuated when propagating in the air, which is a medium, when being reflected at the interface between the air and the contaminant 14, and when being reflected at an interface between the air and the transmission and reception surface portion 22.

<Detection of Whether Contaminant 14 is Present or Absent>

In step S6, the detector 15 determines whether a contaminant 14 is present or absent. As a premise for the determination by the detector 15, the following features are derived from the graphs of FIGS. 7 and 8. The responses of the ultrasonic waves that were made at the times t4 and t5 and subsequent times as responses of the ultrasonic waves to the drain pan 11 in which no contaminant 14 was present appear as indicated in FIG. 7. By contrast, such responses did not appear as indicated in FIG. 8 in the responses of the ultrasonic waves to the drain pan 11 in which the contaminant 14 was present. Furthermore, the peak values of response voltages of the ultrasonic waves to the drain pan 11 as indicated in FIG. 7 in which no contaminant 14 was present and the peak values of response voltages of the ultrasonic waves to the drain pan 11 as indicated in FIG. 8 in which the contaminant 14 was present satisfy the relationships "$P_1 > P_1'$,", "$P_2 > P_2'$,", and "$P_3 > P_3'$.". That is, the peak values of voltages of the responses of the ultrasonic waves to the drain pan 11 in which no contaminant 14 was present were greater than those of the ultrasonic waves to the drain pan 11 in which the contaminant 14 was present. This seems to be because there was a difference in attenuation of the ultrasonic waves between the case where the ultrasonic waves were reflected at the interface between the air and the drain pan 11 and the case where the ultrasonic waves were reflected at the interface between the air and the contaminant 14. That is, it is conceivable that the ultrasonic waves reflected at the contaminant 14 may be more greatly attenuated than those reflected at the drain pan 11.

When the time required for the responses of the ultrasonic waves in the case of using the drain pan 11 as indicated in FIG. 7 in which no contaminant 14 was present was compared with that for the responses of the ultrasonic waves in the case of using the drain pan 11 as indicated in FIG. 8 in which the contaminant 14 was present, it was found that $t_1 \approx t_1'$, $t_2 \approx t_2'$, and $t_3 \approx t_3'$, that is, the above times are nearly equal to each other. This seems to be because the distance by which the ultrasonic waves propagated in the case of using the drain pan 11 in which no contaminant 14 was present was nearly equal to that in the case of using the drain pan 11 in which the contaminant 14 was present. However, the above propagation distance of the ultrasonic waves in the case of the drain pan 11 in which a contaminant 14 having a thickness greater than 1 mm was present differs from that in the case of using the drain pan 11 in which no contaminant 14 was present. It is therefore conceivable that the propagation distance of the ultrasonic waves in the case of using the drain pan 11 in which no contaminant 14 was present is more greatly different from that in the case of using the drain pan 11 in which a contaminant 14 having a thickness greater than 1 mm was present.

In the case where no contaminant was present on the drain pan 11, in the forms (also called "waveforms") of response voltages of the ultrasonic waves, the peak tops were great, and half-widths were small. By contrast, in the case where the contaminant 14 was present on the drain pan 11, in the forms (also called "waveforms") of response voltages of the ultrasonic waves, peak tops are smaller and the half-widths are greater than in the case of using the drain pan 11 in which no contaminant was present. It should be noted that the term "half-width" means the width of time when the value of the voltage is half the peak value.

After the drainage water 29 is drained, based on the above features, the detector 15 determines whether a contaminant 14 is present or absent, from voltage values that are detected as responses by the ultrasonic sensor 16 after ultrasonic waves are emitted from the ultrasonic sensor 16, and reflected and received by the piezoelectric element 23. Then, when determining that the contaminant 14 is present, the detector 15 gives an alarm indicating the need to clean the drain pan 11 (step S7). The user can thus know that the contaminant 14 is present on the drain pan 11.

Figure 9:
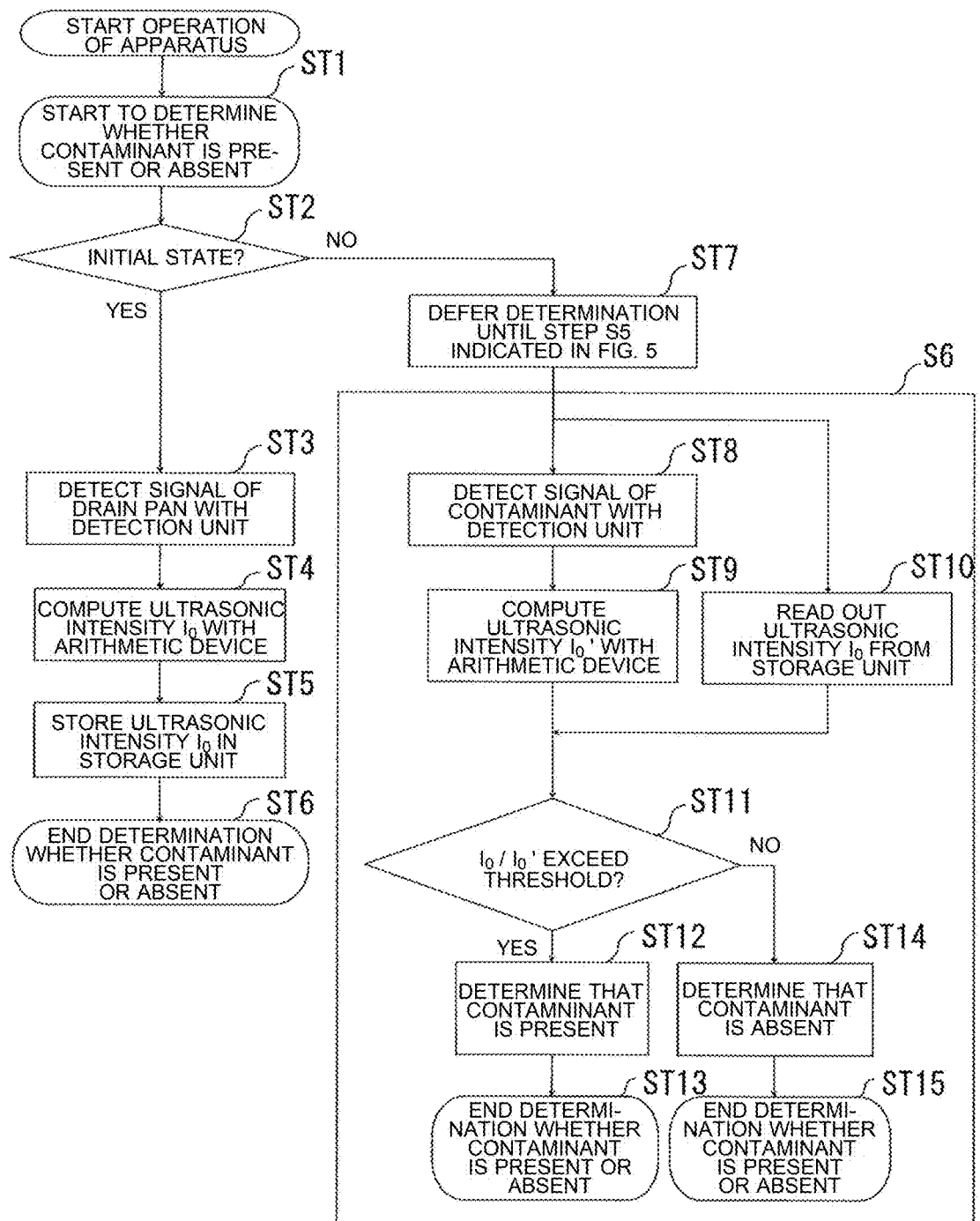
FIG. 9 is a flow chart of the operations as indicated in FIG. 5 in a determination of whether a contaminant is present or absent.

FIG. 9 is a flowchart of operations in the determination as indicated in FIG. 5 as to whether a contaminant 14 is present or absent. A determination of whether a contaminant 14 is present or absent is made by the arithmetic device 17 of the detector 15. When the air-conditioning apparatus 100 starts to operate, the detector 15 starts to determine whether a contaminant 14 is present or absent (step ST1). When starting to determine whether the contaminant 14 is present or absent, the detector 15 determines whether the drain pan 11 is in an initial state or not (step ST2). The initial state of the drain pan 11 is a state in which the contaminant is absent on the drain pan 11 and the drain pan 11 is thus clean, and generally, is a state in which the air-conditioning apparatus 100 is started up and does not yet start to perform the humidification operation or the cooling operation. For example, in the case where the air-conditioning apparatus 100 has performed the humidification operation or the cooling operation, the detector 15 stores in the storage unit 24, a record indicating that the humidification operation or the cooling operation has been performed. Then, the arithmetic device 17 of the detector 15 determines whether the drain pan 11 is in the initial state or not, by referring to data stored in the storage unit 24 and indicating whether the humidification operation or the cooling operation has been performed or not. It should be noted that the initial state of the drain pan 11 may be defined by a worker, and for example, may be defined after the air-conditioning apparatus 100 is started up a number of times; that is, it is not indispensable that the initial state is defined after the air-conditioning apparatus 100 is started up for the first time. Alternatively, regardless of whether the air-conditioning apparatus 100 has performed the humidification operation or the cooling operation, the state of the air-conditioning apparatus 100 started up for the first time may be defined as the initial state of the drain pan 11 in the detector 15.

Next, in step ST2, if YES, that is, the drain pan 11 is in the initial state, the detector 15 detects a signal of the drain pan 11 based on a reflected sound of ultrasonic waves emitted from the ultrasonic sensor 16 (step ST3). It should be noted that as illustrated in FIG. 7, the voltage values detected by the amplifier detection circuit 21 vary between positive and negative values and an ultrasonic intensity cannot be calculated directly from the voltage values. Therefore, the arithmetic device 17 calculates a square value of a voltage value detected by the amplifier detection circuit 21. The arithmetic device 17 integrates this voltage square value with a time period T1 to obtain an ultrasonic intensity I0 [(mV)2×ms], which is the product of the voltage square value P2 [(mV)2] and the time t [ms] (step ST4). The time period T1 is a time period from the time when a first reflected signal is received. The start time of reception of a reflected signal is determined depending on the distance (d) between the ultrasonic sensor 16 and the bottom 11d of the drain pan 11. It is assumed that the beginning of the time period T1 is represented by a value obtained by dividing, by the velocity of sound, the distance (2×d) by which ultrasonic waves travel when going and returning once. Alternatively, it is assumed that the beginning of the time period $T_1$ is represented by a value obtained by multiplying, by an appropriate coefficient (safety factor) of, for example, 0.8 to 1.2, the value obtained by dividing, by the velocity of sound, the distance (2×d) by which ultrasonic waves travel when going and returning once. It is appropriate that a detection time period of a received signal in a clear state is analyzed and the coefficient (safety factor) is set in advance. It is assumed that the end of the time period T1 is a value obtained, for example, by calculating a value (time required to cause ultrasonic waves to go and return ten times) obtained by dividing, by the velocity of sound, the distance (10×2×d) by which ultrasonic waves travel when going and returning ten times, and adding, to this value, a value obtained by doubling the time for which the ultrasonic waves are applied. Alternatively, it is assumed that the end of the time period T1 is a value obtained by multiplying, by an appropriate coefficient (safety factor) of, for example, 0.8 to 1.2, the value obtained, for example, by calculating a value (time required to cause ultrasonic waves to go and return ten times) obtained by dividing, by the velocity of sound, the distance (10×2×d) by which ultrasonic waves travel when going and returning ten times, and adding, to this value, a value obtained by doubling the time for which the ultrasonic waves are applied. It should be noted that the above "going and returning ten times" is merely an example, and the number of times the ultrasonic waves go and return may be arbitrarily set. Furthermore, although the "value obtained by doubling the time for which the ultrasonic waves are applied" is added in the foregoing description, this multiplying factor is not limited to "doubling", but is determined in consideration of reverberant sounds. Furthermore, the end of the time period T1 may be arbitrarily set depending on the accuracy of detection of a detector and the accuracy of calculation of the arithmetic device 17. Next, the arithmetic device 17 stores in the storage unit 24, a value of the ultrasonic intensity I0 [$(mV)^2 \times ms$] for the drain pan 11 in which no contaminant 14 is present, as a value of the initial state of the drain pan 11 in which no contaminant 14 is present (step ST5). When the arithmetic device 17 stores in the storage unit 24, the value of the ultrasonic intensity $I_0$ [$(mV)^2 \times ms$] as the value of the initial state of the drain pan 11, the determination of whether a contaminant 14 is present or absent ends (step ST6). It should be noted that the ultrasonic intensity $I_0$ [$(mV)^2 \times ms$] in the initial state of the drain pan 11 may be stored in advance in the storage unit 24 as a specific value based on the characteristics of the drain pan 11. In this case, when the operation of the air-conditioning apparatus 100 is started, the determination of step ST2 as to whether the drain pan 11 is in the initial state or not is omitted. Then, the detector 15 carries out subsequent steps from step ST7 onward using the ultrasonic intensity $I_0$ [$(mV)^2 \times ms$] stored in the storage unit 24.

Next, in step ST2, if NO, that is, the drain pan 11 is not in the initial state, the detector 15 defers determination of whether a contaminant 14 is present or absent, until the step proceeds to step S5 as indicated in FIG. 5 (step ST7). In step S6 in FIG. 5, the detector 15 detects a signal of the contaminant 14 based on a reflected sound of the ultrasonic waves emitted from the ultrasonic sensor 16 (step ST8). Then, the arithmetic device 17 of the detector 15 obtains the ultrasonic intensity $I_0'$ [$(mV)^2 \times ms$] by performing a computation similar to that of the ultrasonic intensity $I_0$ based on a voltage value detected by the amplifier detection circuit 21, with information indicating whether a contaminant 14 is present or absent not given to the arithmetic device 17 (step ST9). Furthermore, the arithmetic device 17 of the detector 15 reads out the value of the ultrasonic intensity $I_0'$ from the storage unit 24 (step ST10). Then, the arithmetic device 17 of the detector 15 determines whether the ratio between the ultrasonic intensity $I_0$ and the ultrasonic intensity $I_0'$ exceeds a threshold or not (step ST11). That is, the detector 15 receives as signals, reflected sounds of the ultrasonic waves that are reflected respective times, and determines whether a contaminant is present or absent based on a value obtained by integrating the signals with a set time period including a response time period of the reflected sounds reflected respective times. In the case where the arithmetic device 17 of the detector 15 determines that the ratio between the ultrasonic intensity $I_0$ and the ultrasonic intensity $I_0'$ exceeds the threshold, the arithmetic device 17 of the detector 15 determines that the contaminant 14 is present on the drain pan 11 (step ST12). When the arithmetic device 17 of the detector 15 determines that the contaminant 14 is present on the drain pan 11, the determination of whether the contaminant 14 is present or absent ends (step ST13). When the arithmetic device 17 of the detector 15 determines that the ratio between the ultrasonic intensity $I_0$ and the ultrasonic intensity $I_0'$ is less than or equal to the threshold, the arithmetic device 17 of the detector 15 determines that the contaminant 14 is absent on the drain pan 11 (step ST14). When the arithmetic device 17 of the detector 15 determines that the contaminant 14 is absent on the drain pan 11, the determination of whether a contaminant 14 is present or absent ends (step ST15). It should be noted that when the arithmetic device 17 of the detector 15 determines that a contaminant 14 is present on the drain pan 11, an alarm indicating the need to clean the drain pan 11 is given as indicated in step S7 in FIG. 5. When the arithmetic device 17 of the detector 15 determines that the contaminant 14 is absent on the drain pan 11, the operation of the air-conditioning apparatus 100 is stopped as indicated in step S8 in FIG. 5.

The following is considered regarding improvement in the accuracy of determination in a method by which the arithmetic device 17 determines whether a contaminant 14 is present or absent. The ratio between the ultrasonic intensity $I_0$ and the ultrasonic intensity $I_0'$ in the time period T1 is higher by approximately 10 to 30% than the ratio between the ultrasonic intensity $I_0$ and the ultrasonic intensity $I_0'$ computed using only a signal representing the first reflected sound. Therefore, in the case where it is determined whether a contaminant 14 is present or absent based on the ratio between the ultrasonic intensity I0 and the ultrasonic intensity I0' in the time period T1, the accuracy of the determination is higher than in the case where it is determined whether or not a contaminant 14 is present or absent based on the ratio between the ultrasonic intensity I0 and the ultrasonic intensity I0' computed using only a signal representing the first reflected sound. Furthermore, the amplifier detection circuit 21 of the detector 15 detects the voltages of ultrasonic responses both after the above drainage step and immediately before the start of the humidification operation after the drainage step or immediately before the start of cooling operation after the drainage step. Then, in the case where both the ratios of the ultrasonic intensity $I_0$ to the ultrasonic intensity $I_0'$ at the above two timings, that is, after the drainage step and immediately before the start of humidification operation after the drainage step or immediately before the start of cooling operation after the drainage step exceed the threshold, it is determined that the contaminant 14 is formed. Since it is determined by the detector 15 in the above manner as to whether a contaminant 14 is present or absent, the accuracy of the determination as to whether the contaminant 14 is present or absent is improved. The threshold of ultrasonic intensity $I_0$/ultrasonic intensity $I_0'$ may be set to fall within the range of, for example, 2 to 3. Furthermore, it is appropriate that in an actual air-conditioning apparatus 100, it is confirmed in advance what value is determined as ultrasonic intensity $I_0$/ultrasonic intensity $I_0'$ in the case where a contaminant 14 is present, and the threshold of ultrasonic intensity $I_0$/ultrasonic intensity $I_0'$ for determining whether a contaminant 14 is present or absent is determined.

In the above example, the arithmetic device 17 uses the time period T1 for the time t [ms] in computation of the ratio between the ultrasonic intensity $I_0$ and the ultrasonic intensity $I_0'$. However, in order to further improve the accuracy of detection of contaminant 14, for the time t [ms], the arithmetic device 17 can use a time period T2, and preferably, a time period T4. The time period T1, the time period T2, a time period T3, the time period T4, . . . , and a time period Tn are determined as respective time periods subsequent to reception of the first reflected signal, a second reflected signal, . . . , and an n-th reflected signal, respectively. As described above, the start time of reception of a reflected signal is determined depending on the distance (d) between the ultrasonic sensor 16 and the bottom 11d of the drain pan 11. It is assumed that the beginning of the time period T2 or other time periods is represented by a value obtained by dividing, by the velocity of sound, the distance (2×2×d) by which ultrasonic waves travel when going and returning twice. Alternatively, it is assumed that the beginning of the time period T2 or other time periods is represented by a value obtained by multiplying, by an appropriate coefficient (safety factor) of, for example, 0.8 to 1.2, the value obtained by dividing, by the velocity of sound, the distance (2×2×d) by which ultrasonic waves travel when goring and returning twice. It is appropriate that a time period of detection of a received signal in a clear state is analyzed to set the coefficient (safety factor) in advance. It is assumed that the end of the time period T2 or other time periods is a value obtained, for example, by calculating a value (time required to cause ultrasonic waves to go and return ten times) obtained by dividing, by the velocity of sound, the distance (10×2×d) by which ultrasonic waves travel when going and returning ten times, and adding, to this value, a value obtained by doubling the time for which the ultrasonic waves are applied. Alternatively, it is assumed that the end of the time period T2 or other time periods is a value obtained by multiplying, by an appropriate coefficient (safety factor) of, for example, 0.8 to 1.2, the value obtained, for example, by calculating a value (time required to cause ultrasonic waves to go and return ten times) obtained by dividing, by the velocity of sound, the distance (10×2×d) by which ultrasonic waves travel when going and returning ten times, and adding to this value, a value obtained by doubling the time for which the ultrasonic waves are applied. It should be noted that the "going and returning ten times" is merely an example, and the number of times the ultrasonic waves go and return may be arbitrarily set. Furthermore, although the "value obtained by doubling the time for which the ultrasonic waves are applied" is added in the foregoing description, this multiplying factor is not limited to "doubling", but is determined in consideration of reverberant sounds. Furthermore, the ends of the time period T1, the time period T2, the time period T3, the time period T4, . . . , and the time period Tn may be arbitrarily set depending on the accuracy of detection by a detector and the accuracy of computation of the arithmetic device 17. By computing the second and subsequent reflection responses, the arithmetic device 17 can analyze an ultrasonic response subjected a number of times, to ultrasonic attenuation that occurs at the interface between the air and the contaminant 14. Thus, the difference in ultrasonic response between the initial state of the drain pan 11 in which no contaminant 14 is present and the state of the drain pan 11 in which a contaminant 14 is present increases, and the accuracy of detection of a contaminant 14 is thus improved. An experiment was conducted also regarding the case where the arithmetic device 17 used the response voltages in the time period T2 for the time t [ms], in the computation of the ratio between the ultrasonic intensity $I_0$ and the ultrasonic intensity $I_0'$. In this case, in the case of performing a computation using the response voltages of the time period T2 for the time t [ms], the value of ultrasonic intensity $I_0$/ultrasonic intensity $I_0'$ was 3.3 times greater than in the case of performing a computation using only the response voltage of the first reflected sound. In such a manner, in the computation of the ratio between the ultrasonic intensity $I_0$ and the ultrasonic intensity $I_0'$, the arithmetic device 17 performs a computation for signals based on reflected sounds from the second reflected sound onward, whereby a contaminant 14 can be easily detected.

The arithmetic device 17 may employ another computation method instead of integrating the voltage square value for the time periods T1, T2, and T4. To be more specific, the arithmetic device 17 may integrate the voltage square value with the time periods that correspond to the half-widths of the peak voltage values, and compute the ultrasonic intensity I [(mV)$^2$×ms], which is the product of the voltage square values of the time periods. Then, the arithmetic device 17 of the detector 15 compares the ultrasonic intensity $I_0$ in the initial state of the drain pan 11 in which no contaminant 14 is present, with the ultrasonic intensity $I_0'$ of the drain pan 11 which is not determined as to whether a contaminant 14 is present or absent on the drain pan 11. When the ratio between the ultrasonic intensity $I_0$ and the ultrasonic intensity $I_0'$ exceeds the threshold, the arithmetic device 17 of the detector 15 determines that a contaminant 14 is formed. That is, the detector 15 receives as signals, reflected sounds of the ultrasonic waves that are reflected respective times, and determines whether a contaminant is present or absent, based on values obtained by integrating signal values with time, in the time periods corresponding to the half-widths of the peak values of the received signals. In this case, in the determination made whether a contaminant 14 is present or absent, the products of voltage square values of reflections may be compared with each other, voltage square values of multiple reflections may be compared with each other, or all voltage square values may be added. In this case, ultrasonic intensity $I_0$/ultrasonic intensity $I_0'$ may be greater by approximately 10 to 30% than in the case of performing a computation using only the first reflected sound, and the accuracy of determination of whether a contaminant 14 is present or present is improved.

Furthermore, as a method for making a determination of whether a contaminant 14 is present or absent, the arithmetic device 17 may make this determination using the voltage P [mV] of a peak value of an ultrasonic response. That is, the detector 15 receives as signals, reflected sounds of the ultrasonic waves that are reflected respective times, and determines whether a contaminant is present or absent, based on the peak values of the received signals. For example, the arithmetic device 17 compares the sum of the voltages P [mV] of the peak values of the ultrasonic waves in the drain pan 11 in which no contaminant 14 is present, with the sum of the voltages P' [mV] of the peak values of the ultrasonic waves in the drain pan 11 which is not determined with respect to a contaminant 14 is present or absent on the drain pan 11. Then, in the case where the ratio between ΣP and ΣP' exceeds a threshold, the arithmetic device 17 determines that a contaminant 14 is formed on the drain pan 11. In this case, the arithmetic device 17 may, in a computation, use the peak values $P_2$ to $P_n$ and $P_2$ to $P_n'$ of response voltages generated by reflections from the second reflection onward, that is, peak values excluding the peak values $P_1$ and $P_1'$ of the first reflection. That is, the detector 15 determines whether a contaminant is present or absent based on received signals from a second received signal onward. Furthermore, the arithmetic device 17 may use the peak values $P_4$ to $P_n$ and $P_4$ to $P_n'$ of response voltages generated by reflections from the fourth reflection onward. Moreover, the arithmetic device 17 can also determine whether a contaminant 14 is formed, from the ratio between the sum of the voltages P and the sum of the voltages P' (=ΣP/ΣP').

In the above embodiment, since the received signals are voltages, the square values of the voltages are used. However, as in the above example, a computation may be performed after negative voltage values are converted into positive voltage values. Furthermore, although in the above embodiment, the received signals are inputted as voltages, it is not indispensable that the received signals are voltages; that is, the computation may be performed after the received signals may be converted into other digital signals.

It should be noted that ultrasonic waves were measured at the point of time at which the drainage step was completed after the set time period elapsed from the time at which the humidification operation or cooling operation of the air-conditioning apparatus 100 ended. However, ultrasonic waves may be measured before the set time period elapses from the time at which the humidification operation or cooling operation of the air-conditioning apparatus 100 ends, if it is ensured that the measurement is performed without hindrance to the measurement, from a water surface of the drainage water 29. For example, the air-conditioning apparatus 100 may be configured such that a heater is provided close to the ultrasonic sensor 16, and the detector 15 may measure ultrasonic waves after the drainage water 29 is evaporated by heating the heater at the end of the humidification operation or cooling operation of the air-conditioning apparatus 100.

As described above, in the air-conditioning apparatus 100, the bottom flat surface portion 11a forming the bottom 11d of the drain pan 11 is located parallel to the flat surface portion 22a forming a receiving surface of the ultrasonic sensor 16. Therefore, the detector 15 determines whether a contaminant 14 is present or absent based on reflected sounds of ultrasonic waves that are reflected respective times from the contaminant 14. Thus, the accuracy of this determination is improved, as compared with the case where it is determined whether a contaminant 14 is present or absent based on a single reflected sound of ultrasonic waves. More particularly, in the air-conditioning apparatus 100, when it is determined that the drainage water 29 is sufficiently drained, that is, that the drainage step is completed, the detector 15 causes the ultrasonic sensor 16 to emit ultrasonic waves. Furthermore, the piezoelectric element 23 receives ultrasonic oscillations, and the amplifier detection circuit 21 detects the ultrasonic oscillations as a response having multiple peak voltages. When the contaminant 14 is present, the emitted ultrasonic waves are attenuated by the contaminant 14. Therefore, in the air-conditioning apparatus 100, the detector 15 computes the ultrasonic intensity of ultrasonic waves reflected a number of times, thereby improving the accuracy of detection of whether a contaminant 14 is present or absent.

Furthermore, the detector 15 is featured in that ultrasonic waves that are emitted from the ultrasonic sensor 16 by a single output operation of the ultrasonic sensor 16 are reflected a number of times between a contaminant adhered to the drain pan 11 and the flat surface portion 22a of the ultrasonic sensor 16. Therefore, the detector 15 determines whether a contaminant 14 is present or absent based on reflected sounds of ultrasonic waves that are reflected respective times from the contaminant 14, thereby improving the accuracy of detection of the contaminant 14, as compared with the case where it is determined whether a contaminant 14 is present or absent, based on a single reflected sound of ultrasonic waves.

Furthermore, the detector 15 receives as signals, reflected sounds of the ultrasonic waves that are reflected respective times, and determines whether a contaminant is present or absent, based on a value obtained by integrating the received signals with a set time period including a response time period of the reflected sounds made respective times. Alternatively, the detector 15 receives as signals, reflected sounds of the ultrasonic waves that are reflected respective times, and determines whether a contaminant is present or absent based on values obtained by integrating signal values with time in time periods corresponding to the half-widths of the peak values of the received signals. Alternatively, the detector 15 receives as signals, reflected sounds of the ultrasonic waves that are reflected respective times, and determines whether a contaminant is present or absent based on the respective peak values of the received signals. Alternatively, the detector 15 determines whether a contaminant is present or absent based on received signals from a second received signal onward. In these cases, the detector 15 determines whether a contaminant 14 is present or absent based on reflected sounds of ultrasonic waves that are reflected respective times from the contaminant 14, thereby improving the accuracy of detection of contaminant 14 than in the case where it is determined whether a contaminant 14 is present or absent based on based on a single reflected sound of ultrasonic waves. In addition, since noise can be eliminated from the signals, the accuracy of detection of a contaminant 14 is improved.

Furthermore, in the air-conditioning apparatus 100, the drain pan 11 and the ultrasonic sensor 16 are provided apart from each other such that the distance between the bottom flat surface portion 11a and the flat surface portion 22a is 10 to 200 mm. In the air-conditioning apparatus, since the drain pan 11 and the ultrasonic sensor 16 are arranged in such a manner, it is possible to obtain reflected sounds of ultrasonic waves that are reflected respective times between the ultrasonic sensor 16 and the drain pan 11 or the contaminant 14.

Embodiment 2

Figure 10:
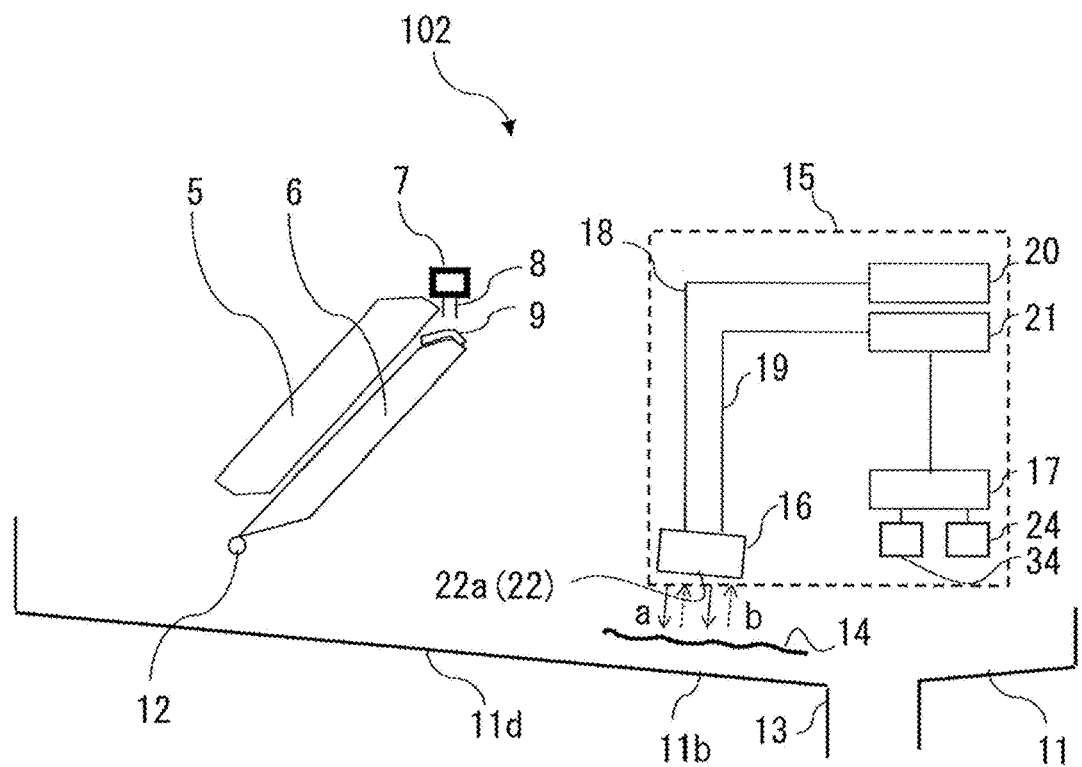
FIG. 10 is a schematic view illustrating a section of a drain pan and components located in the vicinity of the drain pan in an air-conditioning apparatus according to Embodiment 2 of the present disclosure.

FIG. 10 is a schematic view illustrating a section of a drain pan 11 and components provided in the vicinity of the drain pan 11 in an air-conditioning apparatus 102 according to Embodiment 2 of the present disclosure. As illustrated in FIG. 10, the air-conditioning apparatus 102 according to Embodiment 2 is configured such that a bottom flat surface portion 11b of the bottom 11d of the drain pan 11 has an area inclined to a horizontal plane, and the drainpipe 13 is provided in the lowermost part of the inclined bottom 11d of the drain pan 11. In such a manner, in the air-conditioning apparatus 102 according to Embodiment 2, the bottom flat surface portion 11b of the drain pan 11 has the inclined area to the horizontal plane. In this regard, the air-conditioning apparatus 102 according to Embodiment 2 differs from the air-conditioning apparatus 100 according to Embodiment 1 in which the bottom flat surface portion 11a of the drain pan 11 is located parallel to the horizontal plane. The other configurations of the air-conditioning apparatus 102 according to Embodiment 2 are the same as those of the air-conditioning apparatus 100 according to Embodiment 1, and their descriptions will thus be omitted.

<Configuration of Drain Pan 11 and Components in the Vicinity of Drain Pan 11>

In the air-conditioning apparatus 102 according to Embodiment 2, the detector 15 is provided above the drain pan 11, and the bottom 11d the drain pan 11 is inclined at the same angle as the transmission and reception surface portion 22 of the ultrasonic sensor 16 of the detector 15. To be more specific, in the air-conditioning apparatus 102 according to Embodiment 2 includes the drain pan 11 that has the bottom 11d inclined to the horizontal plane, and the detector 15 that has the transmission and reception surface portion 22 inclined at the same angle as the bottom 11d of the drain pan 11. In the air-conditioning apparatus 102 according to Embodiment 2, the bottom flat surface portion 11b of the bottom 11d of the drain pan 11 and the flat surface portion 22a of the transmission and reception surface portion 22 are located parallel to each other.

<Operation of Air-Conditioning Apparatus 102>

When the air-conditioning apparatus 102 performs the humidification operation or the cooling operation, water droplets 12 that leaks from the humidifying material 6 without being used in humidification or water droplets 12 of condensation water generated around the heat exchanger 5 drop from the humidifying material 6 or the heat exchanger 5 onto the drain pan 11, and are received as drainage water by the drain pan 11. In the air-conditioning apparatus 102, since drainage water that collects on the drain pan 11 is drained through the drainpipe 13 provided in the lowermost part of the drain pan 11, the drainage water is more easily drained than in the air-conditioning apparatus 100 of Embodiment 1.

<Operation of Detecting Contaminant 14>

During the humidification operation or during cooling operation of the air-conditioning apparatus 102 according to Embodiment 2, since the drain pan 11 is inclined, the drainage water 29 flows out of the drain pan 11 to the outside. The amount of water that remains on the drain pan 11 is smaller than in the air-conditioning apparatus 100 of Embodiment 1. The detector 15 uses the ultrasonic sensor 16 to emit ultrasonic pulse waves in the direction indicated by solid arrows a that is perpendicular to the drain pan 11, and detects a number of times, respective responses of ultrasonic waves that arrives at and are then reflected by a contaminant 14. The arithmetic device 17 of the detector 15 detects the ultrasonic responses, and when the ratio of the ultrasonic intensity $I_0$ to the ultrasonic intensity $I_0'$ exceeds the threshold, the arithmetic device 17 determines that the contaminant 14 is formed. Then, as the contaminant 14 are present on the drain pan 11, the detector 15 gives an alarm indicating the need to clean the drain pan 11.

In such a manner, in the air-conditioning apparatus 102 according to Embodiment 2, since the drain pan 11 is inclined, drainage water on the drain pan 11 can be more easily drained than in the air-conditioning apparatus 100 according to Embodiment 1. Therefore, in the air-conditioning apparatus 102 according to Embodiment 2, it is possible to detect whether a contaminant 14 is present or absent, with ultrasonic waves without being affected by a water surface of the drainage water. Therefore, in the air-conditioning apparatus 102 according to Embodiment 2, it is possible to detect whether a contaminant 14 is present or absent with a higher accuracy than in the air-conditioning apparatus 100 according to Embodiment 1.

Furthermore, in the air-conditioning apparatus 102 according to Embodiment 2, the drain pan 11 has the area inclined to the horizontal plane, and the drainpipe 13 is provided in the lowermost part of the inclined drain pan 11. Therefore, in the air-conditioning apparatus 102 according to Embodiment 2, a larger amount of drain water can be drained from a region located below the detector 15 than in the air-conditioning apparatus 100 according to Embodiment 1. As a result, in the air-conditioning apparatus 102 according to Embodiment 2, it is possible to detect whether a contaminant 14 is present or absent with a higher degree than in the air-conditioning apparatus 100 according to Embodiment 1.

Embodiment 3

Figure 11:
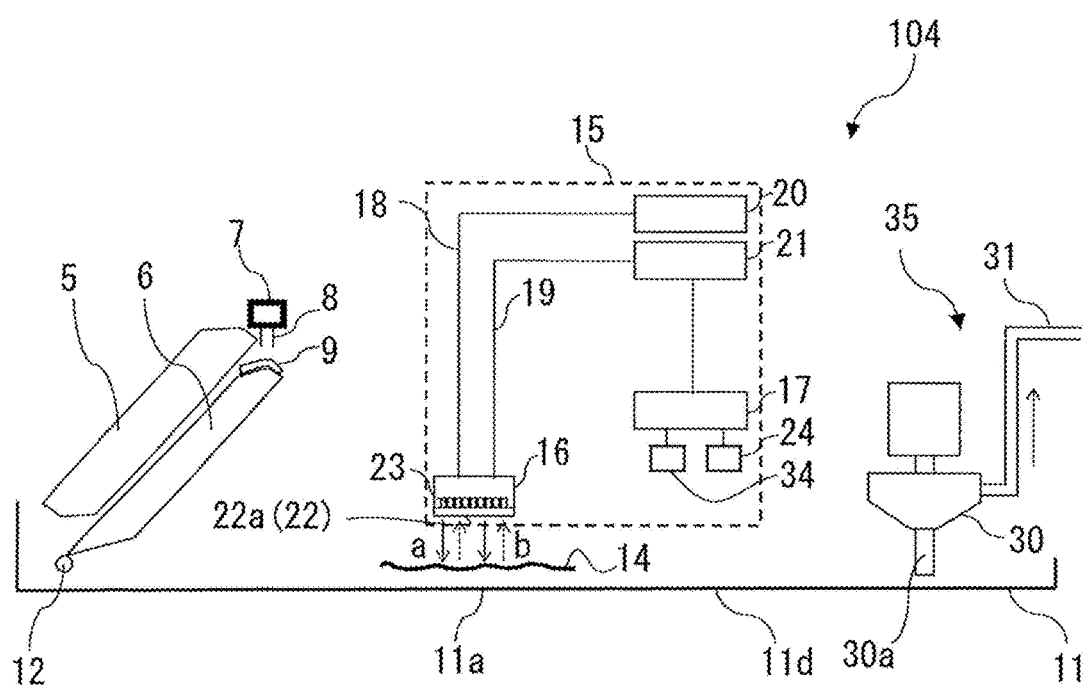
FIG. 11 is a schematic view illustrating a section of a drain pan and components located in the vicinity of the drain pan in an air-conditioning apparatus according to Embodiment 3 of the present disclosure.

FIG. 11 is a schematic view illustrating a section of a drain pan 11 and components located in the vicinity of the drain pan 11 in an air-conditioning apparatus 104 according to Embodiment 3 of the present disclosure. In the air-conditioning apparatus 104 according to Embodiment 3 includes a drain pump 30 and a drainage drainpipe 31. In this regard, the air-conditioning apparatus 104 according to Embodiment 3 differs from the air-conditioning apparatus 100 according to Embodiment 1. Unlike the air-conditioning apparatus 100 according to Embodiment 1, the air-conditioning apparatus 104 according to Embodiment 3 is used, for example, in a place where drainage water does not easily naturally flow out from the drainpipe 13 only because of the force of gravity. The other configurations of the air-conditioning apparatus 104 according to Embodiment 3 are the same as those of the air-conditioning apparatus 100 according to Embodiment 1, and their descriptions will thus be omitted.

<Configuration of Drain Pan 11 and Components in the Vicinity thereof>

The air-conditioning apparatus 104 includes a drainage unit 35 that drains water received by the drain pan 11. The drainage unit 35 is provided above the drain pan 11, and includes a drain pump 30 that sucks up water from the drain pan 11 via a suction portion 30a and a drainage drainpipe 31 that allows the water sucked up by the drain pump 30 to flow out to the outside. The drain pump 30 is, for example, a pump provided with a propeller that operates by electricity, is provided above the drain pan 11, and sucks drainage water on the drain pan 11 through the suction portion 30a. The drainage drainpipe 31 is connected to the drain pump 30, and allows the drainage water sucked up by the drain pump 30 to flow out to the outside. A combination of the drain pump 30 and the drainage drainpipe 31 is an example of the drainage unit 35. The drainage water on the drain pan 11 is forcibly sucked up from the drain pan 11 by the power of the drain pump 30, and caused to flow out to the outside through the drainage drainpipe 31.

<Operations of Air-Conditioning Apparatus 104>

When the air-conditioning apparatus 104 performs the humidification operation or the cooling operation, water droplets 12 that leaks from the humidifying material 6 without being used in humidification or water droplets 12 of condensation water generated around the heat exchanger 5 drop from the humidifying material 6 or the heat exchanger 5 onto the drain pan 11, and are received as drainage water by the drain pan 11. The drainage water that has dropped onto the drain pan 11 is pumped up by the operation of the drain pump 30 and caused to flow out to the outside via the drainage drainpipe 31 without staying at the drain pan 11. Furthermore, on the drain pan 11, the water level of the drainage water is kept lower than the level of the suction portion 30a, and a state in which the drainage water is drained is maintained. Thus, even when the air-conditioning apparatus 104 is in the humidification operation or the cooling operation, the drainage step can be carried out, whereby the air-conditioning apparatus 104 can keep the amount of drainage water less than or equal to a certain amount.

<Operation of Detecting Contaminant 14>

During the humidification operation or during cooling operation of the air-conditioning apparatus 104, the drain pan 11 is in a state in which water is drained from the drain pan 11 by the operation of the drain pump 30 as illustrated in FIG. 11. At this time, the detector 15 causes the piezoelectric element 23 in the ultrasonic sensor 16 to oscillate to emit ultrasonic pulse waves having a wavelength of 300 kHz. The ultrasonic waves propagate in the air in the direction indicated by solid arrows a that is perpendicular to the drain pan 11, and are reflected at the interface between the contaminant 14 and the air. The reflected ultrasonic waves propagate in the air in the direction indicated by dashed arrows b toward the transmission and reception surface portion 22 of the ultrasonic sensor 16, and the piezoelectric element 23 of the ultrasonic sensor 16 obtains a first oscillation because of the ultrasonic waves that have arrived at the ultrasonic sensor 16. Then, some of ultrasonic waves that have arrived at the ultrasonic sensor 16 are reflected at the transmission and reception surface portion 22, propagate in the air in the direction indicated by the solid arrows a that is perpendicular to the drain pan 11, and are re-reflected at the interface between the contaminant 14 and the air. The reflected ultrasonic waves propagate in the air in the direction indicated by the dashed arrows b toward the transmission and reception surface portion 22 of the ultrasonic sensor 16, and the piezoelectric element 23 of the ultrasonic sensor 16 obtains a second oscillation because of the ultrasonic waves that have arrived at the ultrasonic sensor 16. The above phenomenon is repeated, and the piezoelectric element 23 of the ultrasonic sensor 16 obtains oscillations up to an n-th oscillation in which ultrasonic reflections do not occur. Then, n voltages (generated between the electrodes 25 and 26 are detected by the amplifier detection circuit 21. The arithmetic device 17 performs a computation based on the responses detected by the amplifier detection circuit 21, and determines whether a contaminant 14 is present or absent. When the arithmetic device 17 determines that the contaminant 14 is present, an alarm indicating the need to clean the drain pan 11 is given. The user can thus know the presence of the contaminant 14 on the drain pan 11. In such a manner, also when the air-conditioning apparatus 104 is in the humidification operation or cooling operation, water can be drained from the drain pan 11, and it is possible to detect whether a contaminant 14 is present or absent.

It should be noted that the drainage water on the drain pan 11 is not drained immediately after the drain pump 30 is operated; that is, the drainage water is drained after a time lag from the time at which the drain pump 30 is operated. During the humidification operation or cooling operation of the air-conditioning apparatus 104, the contaminant 14 is immersed in the drainage water 29 and submerged. However, when a time period elapses after the humidification operation or cooling operation of the air-conditioning apparatus 104 is stopped, the water level drops, and as a result, the contaminant 14 is exposed to the air. Because of the drainage step based on the operation of the drain pump 30, it is possible to eliminate the influence of the drainage water 29 on the measurement of ultrasonic waves, by detecting whether the contaminant 14 is present or absent, after a certain period of time elapses, that is, after a steady state is achieved. Therefore, the drainage step based on the operation of the drain pump 30 is desirable for the operation of detecting a contaminant 14.

The air-conditioning apparatus 104 according to Embodiment 3 of the present disclosure that has the above configuration includes the drain pump 30 that is provided above the drain pan 11 to suck up water, and the drainage drainpipe 31 that allows the water to flow out to the outside. Therefore, also when the air-conditioning apparatus 104 is in the humidification operation or cooling and heating operation, the contaminant 14 is not immersed in the drainage water 29. As a result, the detector 15 can detect whether the contaminant 14 is present or absent without mistakenly determining whether the contaminant 14 is present or absent, as the result of detection influenced by the water surface of the drainage water 29.

Embodiment 4

Figure 12:
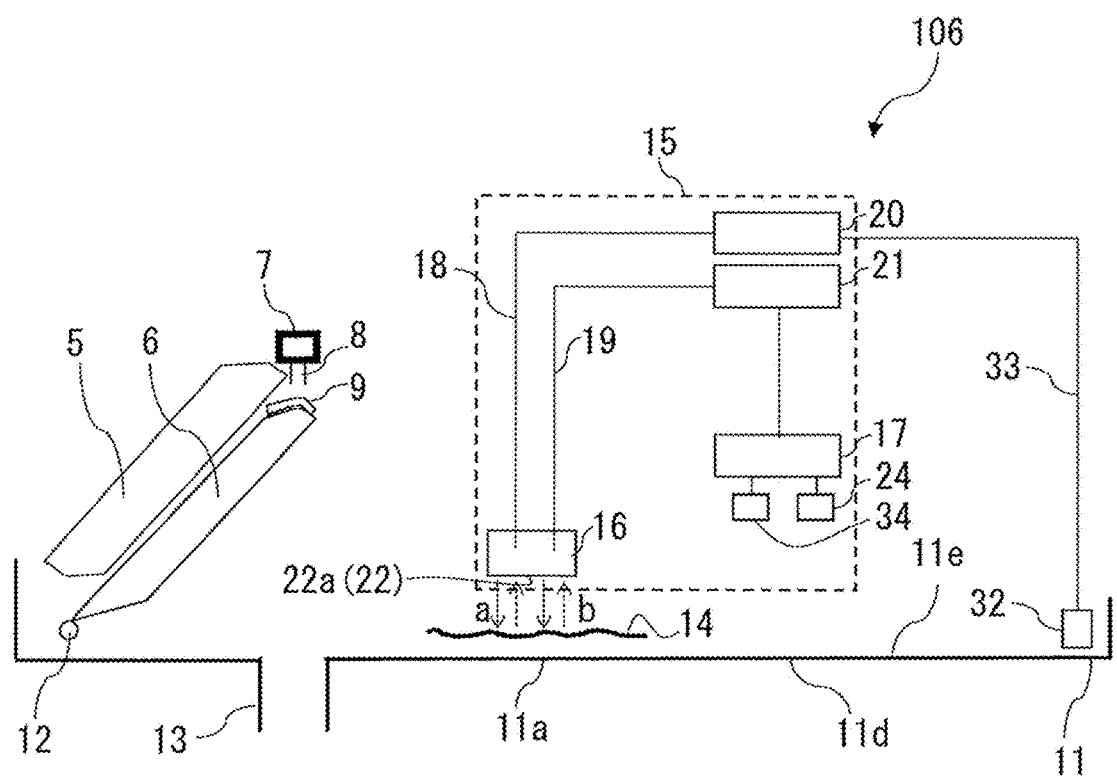
FIG. 12 is a schematic view illustrating a section of a drain pan and components located in the vicinity of the drain pan in an air-conditioning apparatus according to Embodiment 4 of the present disclosure.

FIG. 12 is a schematic view illustrating a drain pan 11 and components located in the vicinity of the drain pan 11 in an air-conditioning apparatus 106 according to Embodiment 4 of the present disclosure. As illustrated in FIG. 12, in the air-conditioning apparatus 106 according to Embodiment 4, a water-level sensor 32 is provided at an upper surface portion 11*e* of the bottom 11*d* of the drain pan 11. In this regard, the air-conditioning apparatus 106 according to Embodiment 4 differs from the air-conditioning apparatus 100 and the air-conditioning apparatuses according to Embodiments 1 to 3. The other configurations of the air-conditioning apparatus 106 according to Embodiment 4 are the same as those of the air-conditioning apparatus 100 according to Embodiment 1, and their descriptions will thus be omitted.

The water-level sensor 32 provided in the air-conditioning apparatus 106 detects the water level of water received by the drain pan 11. When the water level detected by the water-level sensor 32 is zero or an approximation of zero, the detector 15 determines that drainage of water of the drain pan 11 is completed, and starts to detect a contaminant 14. The water-level sensor 32 is connected to the power supply 20 by an electric wire 33, and monitors at all times the water level of drainage water collected in the drain pan 11. When the water-level sensor 32 detects that the water level reaches a certain value or less that is close to zero, the detector 15 determines that drainage of the drainage water ends, and starts to detect a contaminant 14. The water-level sensor 32 is a float switching device.

<Operation of Detecting Contaminant 14>

When the humidification operation or cooling operation of the air-conditioning apparatus 106 ends, the supply of water droplets 12 from the humidifying material 6 or the heat exchanger 5 onto the drain pan 11 is stopped, and the drainage water is drained from the drain pan 11. When the water-level sensor 32 notifies the detector 15 that the water level is less than or equal to the certain value that is close to zero, the detector 15 starts to detect a contaminant 14. The detector 15 causes the ultrasonic sensor 16 to emit ultrasonic waves in the direction indicated by solid arrows a that is perpendicular to the drain pan 11. The ultrasonic waves propagate in the air in the direction indicated by the solid arrows a that is perpendicular to the drain pan 11 and are reflected at the interface between the contaminant 14 and the air. The reflected ultrasonic waves propagate in the air in the direction indicated by dashed allows b toward the transmission and reception surface portion 22 of the ultrasonic sensor 16, and the piezoelectric element 23 of the ultrasonic sensor 16 obtains a first oscillation because of the ultrasonic waves that have arrived at the ultrasonic sensor 16. Then, some of the ultrasonic waves that have arrived at the ultrasonic sensor 16 are reflected at the transmission and reception surface portion 22, propagate in the air in the direction indicated by the solid arrows a that is perpendicular to the drain pan 11, and are re-reflected at the interface between the contaminant 14 and the air. The reflected ultrasonic waves propagates in the air in the direction indicated by the dashed allows b toward the transmission and reception surface portion 22 of the ultrasonic sensor 16, and the piezoelectric element 23 of the ultrasonic sensor 16 obtains a second oscillation because of the ultrasonic waves that have arrived at the ultrasonic sensor 16. The above phenomenon is repeated, and the piezoelectric element 23 of the ultrasonic sensor 16 obtains oscillations up to an n-th oscillation in which ultrasonic reflection does not occur. Then, n voltages generated between the electrode 25 and the electrode 26 are detected by the amplifier detection circuit 21. The arithmetic device 17 performs a computation based on the responses detected by the amplifier detection circuit 21 and determines whether a contaminant 14 is present or absent. In the case where the arithmetic device 17 determines that the contaminant 14 is present, an alarm indicating the need to clean the drain pan 11 is given. The user can thus know whether a contaminant 14 is present on the drain pan 11. In such a manner, also when the air-conditioning apparatus 106 is in the humidification operation or cooling operation, water can be drained from the drain pan 11, and it is possible to detect whether a contaminant 14 is present or absent.

Although the above description is made by referring to by way of example the case where a float switching device is used as the water-level sensor 32, the water-level sensor 32 is not limited to the float switching device, but may be another type of device such as an ultrasonic reflection device or an infrared reflection device. Furthermore, the water-level sensor 32 may be provided at any location at the upper surface portion 11e of the bottom 11d of the drain pan 11. Furthermore, in the air-conditioning apparatus 106, drainage water is drained via the drainpipe 13. However, the air-conditioning apparatus 106 may be configured such that for example, drainage water is drained by the drain pump 30 and the drainage drainpipe 31, which are provided above the drain pan 11.

As described above, in the air-conditioning apparatus 106 according to Embodiment 4 of the present disclosure, the water-level sensor 32 is provided at the upper surface portion 11e of the drain pan 11. When the water-level sensor 32 detects that the water level of drainage water is zero or an approximation of zero, the detector 15 determines that drainage of the drainage water is completed. Since the detector 15 starts to detect a contaminant 14 based on the result of detection by the water-level sensor 32, the detector 15 can eliminate the influence of drainage water as much as possible and detect a contaminant 14 in this state.

REFERENCE SIGNS LIST 1 housing 2 air inlet 3 filter 4 fan 5 heat exchanger 6 humidifying material 7 supply unit 8 nozzle 9 diffusing material 10 air outlet drain pan 11a bottom flat surface portion 11b bottom flat surface portion 11d bottom 11e upper surface portion 12 water droplet 13 drainpipe 14 contaminant 15 detector 16 ultrasonic sensor 16a housing 16b housing 17 arithmetic device 18 electric wire 19 electric wire 20 power supply 21 amplifier detection circuit 22 transmission and reception surface portion 22a flat surface portion 23 piezoelectric element 23a piezoelectric element 23b piezoelectric element 24 storage unit 25 electrode 25a electrode 25b electrode 26 electrode 26a electrode 26b electrode 27 lead 27a lead 27b lead 28 lead 28a lead 28b lead 29 drainage water 30 drain pump 30a suction portion 31 drainage drainpipe 32 water-level sensor 33 electric wire 34 timing unit 35 drainage unit 100 air-conditioning apparatus 102 air-conditioning apparatus 104 air-conditioning apparatus 106 air-conditioning apparatus

The invention claimed is:

1. An air-conditioning apparatus comprising:
a drain pan configured to receive water;
an ultrasonic sensor configured to emit and receive ultrasonic waves; and
a detector configured to detect a contaminant adhered to the drain pan,
wherein the detector causes ultrasonic waves that are emitted as a single output from the ultrasonic sensor to be reflected more than one time between the contaminant adhered to the drain pan and the ultrasonic sensor,
the detector is configured to determine whether the contaminant is absent or present based on plural-reflected ultrasonic waves that are ultrasonic waves received by the ultrasonic sensor after being emitted as the single output from the ultrasonic sensor and being reflected from an upper surface of the contaminant and a lower surface of the ultrasonic sensor more than one time, and
the detector receives as signals, reflected sounds of the ultrasonic waves that are reflected respective times, and determines whether the contaminant is absent or present, based on values obtained by integrating the received signals in time periods corresponding to half-widths of peak values of the received signals.

2. The air-conditioning apparatus of claim 1, wherein the contaminant is a biofilm.

3. The air-conditioning apparatus of claim 1, wherein the detector receives as signals, reflected sounds of the ultrasonic waves that are reflected respective times, and determines whether the contaminant is present or absent, based on values obtained by integrating the signals with a set time period including response time periods of the reflected sounds.

4. The air-conditioning apparatus of claim 3, wherein the detector determines whether the contaminant is present or absent based on ones of the signals that are received signals from a second received signal onward.

5. The air-conditioning apparatus of claim 1, wherein the detector receives as signals, reflected sounds of the ultrasonic waves that are reflected respective times, and determines whether the contaminant is present or absent based on peak values of the signals.

6. The air-conditioning apparatus of claim 1, wherein the ultrasonic sensor is an integrated ultrasonic element configured to transmit and receive the ultrasonic waves with a single piezoelectric element.

7. The air-conditioning, apparatus of claim 1, wherein the ultrasonic sensor is provided by combing a piezoelectric element for use in transmission of the ultrasonic waves and a piezoelectric element for use in reception of the ultrasonic waves.

8. The air-conditioning apparatus of claim 1, wherein the detector includes an arithmetic device including processing circuitry configured to analyze a response signal from the ultrasonic sensor to detect whether the contaminant is present or absent on the drain pan.

9. The air-conditioning apparatus of claim 1, wherein the drain pan has an area inclined to a horizontal plane.

10. The air-conditioning apparatus of claim 1, further comprising a drainage unit configured to drain water received by the drain pan,
wherein the drainage unit includes
a drain pump provided above the drain pan and configured to suck up water in the drain pan, from a suction pipe, and
a drainage drainpipe configured to allow water sucked up by the drain pump to flow out to an outside of the air-conditioning apparatus.

11. The air-conditioning apparatus of claim 1, wherein when a set time period elapses after a cooling operation or a humidification operation is stopped, the detector determines that drainage of water in the drain pan is completed, and starts to detect the contaminant.

12. The air-conditioning apparatus of claim 1, further comprising a water-level sensor configured to detect a water level of water received by the drain pan,
wherein when a water level detected by the water-level sensor is zero or an approximation of zero, the detector determines that drainage of water in the drain pan is completed, and starts to detect the contaminant.

13. The air-conditioning apparatus of claim 1, wherein a bottom flat surface portion that forms a bottom of the drain pan is located parallel to a flat surface portion that forms a receiving surface of the ultrasonic sensor.

14. The air-conditioning apparatus of claim 13, wherein the detector causes ultrasonic waves that are emitted as a single output from the ultrasonic sensor to be reflected a number of times between the contaminant adhered to the drain pan and the flat surface portion of the ultrasonic sensor.

15. The air-conditioning apparatus of claim 13, wherein the drain pan and the ultrasonic sensor are provided apart from each other such that a distance between the bottom flat surface portion and the flat surface portion is 10 to 200 mm.

16. The air-conditioning apparatus of claim 1, wherein:
the single output from the ultrasonic sensor is reflected more than one time from an upper surface of the contaminant including at least a first reflected ultrasonic wave and a second reflected ultrasonic wave being a further reflected version of the first reflected ultrasonic wave; and
the detector is configured to detect the contaminant adhered to the drain pan based on at least the first reflected ultrasonic wave and the second reflected ultrasonic wave.

17. The air-conditioning apparatus according to claim 1, wherein the detector determines whether the contaminant is present or absent based on a comparison of
the values obtained by integrating the received signal in time periods corresponding to half-widths of peak values of the received signals with
values obtained by integrating the received signal in time periods corresponding to half-widths of peak values of the received signals when no contaminant is present.

18. An air-conditioning apparatus comprising:
a fan;
a heat-exchanger;
a drain pan configured to receive water;
an ultrasonic sensor configured to emit and receive ultrasonic waves; and
a detector configured to detect a contaminant adhered to the drain pan,
wherein the detector causes ultrasonic waves that are emitted as a single output from the ultrasonic sensor to be reflected more than one time between the contaminant adhered to the drain pan and the ultrasonic sensor,
the detector is configured to determine whether the contaminant is absent or present based on plural-reflected ultrasonic waves that are ultrasonic waves received by the ultrasonic sensor after being emitted as the single output from the ultrasonic sensor and being reflected from an upper surface of the contaminant and a lower surface of the ultrasonic sensor more than one time, and
the detector receives as signals, reflected sounds of the ultrasonic waves that are reflected respective times, and determines whether the contaminant is absent or present, based on values obtained by integrating the received signals in time periods corresponding to half-widths of peak values of the received signals.

* * * * *